US012668065B2

(12) United States Patent
Osakabe et al.

(10) Patent No.: US 12,668,065 B2
(45) Date of Patent: Jun. 30, 2026

(54) LIQUID EJECTING DEVICE AND LIQUID RESERVOIR TO INCREASE VOLUME RATIO OF STORED LIQUID

(71) Applicant: BROTHER KOGYO KABUSHIKI KAISHA, Nagoya (JP)

(72) Inventors: Yoshinori Osakabe, Seto (JP); Taichi Shirono, Nagoya (JP); Fumio Nakazawa, Okazaki (JP); Sosuke Kuroyanagi, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 355 days.

(21) Appl. No.: 17/814,859

(22) Filed: Jul. 26, 2022

(65) Prior Publication Data

US 2023/0022407 A1 Jan. 26, 2023

(30) Foreign Application Priority Data

Jul. 26, 2021 (JP) ................................ 2021-121987

(51) Int. Cl.
*B41J 2/175* (2006.01)
*B41J 2/19* (2006.01)
*B41J 29/13* (2006.01)

(52) U.S. Cl.
CPC ....... *B41J 2/17596* (2013.01); *B41J 2/17513* (2013.01); *B41J 2/1752* (2013.01);
(Continued)

(58) Field of Classification Search
CPC .. B41J 2/17596; B41J 2/17513; B41J 2/1752; B41J 2/17566; B41J 2/19; B41J 29/13; B41J 2002/17573; B41J 2002/17576
See application file for complete search history.

(56) References Cited

U.S. PATENT DOCUMENTS 5,963,237 A 10/1999 Ikkatai et al.
6,022,102 A * 2/2000 Ikkatai .................. B41J 2/1755 347/85

(Continued)

FOREIGN PATENT DOCUMENTS

CN 113631393 A * 11/2021 ............. B41J 2/175
EP 0 803 364 A2 10/1997

(Continued)

OTHER PUBLICATIONS

Extended European Search Report issued in corresponding European Patent Application No. 22186829.2, Nov. 8, 2022.

(Continued)

*Primary Examiner* — Yaovi M Ameh
(74) *Attorney, Agent, or Firm* — Merchant & Gould P.C.

(57) ABSTRACT

A liquid ejecting device includes a head having a nozzle configured to eject liquid, a container that is connected with the head and is configured to store the liquid, a communication section configured to communicate an internal space of the container with atmosphere, and a liquid reservoir configured to store the liquid and to be removably attached to the container. An internal space of the liquid reservoir is communicated with the internal space of the container through a liquid flow path and a gas flow path in an attached state where the liquid reservoir is attached to the container.

27 Claims, 22 Drawing Sheets

(52) U.S. Cl.
CPC ............. *B41J 2/17566* (2013.01); *B41J 2/19* (2013.01); *B41J 2002/17573* (2013.01); *B41J 2002/17576* (2013.01); *B41J 29/13* (2013.01)

(56) References Cited

U.S. PATENT DOCUMENTS

| | | | | |
|---|---|---|---|---|
| 8,186,815 | B2 | 5/2012 | Shimizu | |
| 10,899,133 | B2 | 1/2021 | Nukui et al. | |
| 2006/0192820 | A1* | 8/2006 | Umeda | B41J 2/17556 347/85 |
| 2010/0231669 | A1 | 9/2010 | Ito | |
| 2010/0245501 | A1 | 9/2010 | Kanbe et al. | |
| 2013/0033539 | A1* | 2/2013 | Watanabe | B41J 2/17513 347/20 |
| 2014/0071211 | A1* | 3/2014 | Kawajiri | B41J 2/17553 347/86 |
| 2016/0052290 | A1 | 2/2016 | Takahashi et al. | |
| 2018/0178532 | A1 | 6/2018 | Sato et al. | |
| 2018/0178541 | A1 | 6/2018 | Kobayashi et al. | |
| 2020/0108617 | A1* | 4/2020 | Tokisawa | B41J 2/175 |
| 2022/0009245 | A1 | 1/2022 | Osakabe | |

FOREIGN PATENT DOCUMENTS

| | | | |
|---|---|---|---|
| EP | 3 162 573 | A1 | 5/2017 |
| EP | 3 263 343 | A1 | 1/2018 |
| JP | 55-65560 | A | 5/1980 |
| JP | H10-029318 | A | 2/1998 |
| JP | 2003-226022 | A | 8/2003 |
| JP | 2008-238530 | A | 10/2008 |
| JP | 2018-108649 | A | 7/2018 |
| JP | 2020-059131 | A | 4/2020 |
| JP | 2020-157677 | A | 10/2020 |
| WO | 2020/196729 | A1 | 10/2020 |

OTHER PUBLICATIONS

Office Action issued in corresponding European Patent Application No. 22186829.2, Nov. 26, 2024.

* cited by examiner

LIQUID EJECTING DEVICE AND LIQUID RESERVOIR TO INCREASE VOLUME RATIO OF STORED LIQUID

REFERENCE TO RELATED APPLICATIONS

This application claims priority from Japanese Patent Application No. 2021-121987 filed on Jul. 26, 2021. The entire content of the priority application is incorporated herein by reference.

BACKGROUND ART

Inkjet printers are required to maintain a meniscus formed at each nozzle of a head thereof, in order to keep a desirable ink ejecting state. As a method for maintaining the meniscus, a method to provide a back pressure control mechanism to a cartridge storing ink has been known.

Further, an inkjet pen has been known that is configured to perform image recording by ejecting, from a nozzle, ink stored in a sub tank. In this inkjet pen, a liquid surface level of the ink stored in an ink cartridge is higher than an opening of the nozzle.

DESCRIPTION

In the known inkjet pen, the cartridge to store ink is provided with, for instance, a foam body or a differential pressure valve as the back pressure control mechanism. However, if a foam body is provided to the cartridge, it may cause problems such as that a volume ratio of the ink storable in the cartridge decreases and that the foam body remains when the cartridge is disposed of. Further, if a differential pressure valve is provided to the cartridge, it may cause problems such as that an ink supply system including the cartridge becomes larger in size. Moreover, if ink is supplied from the cartridge to the head without storing it on the way, air bubbles may enter the head after the ink stored in the cartridge runs out. The above problems may also be caused in printers configured to store ink in a tank removably attached to a sub tank.

Aspects of the present disclosure are advantageous to provide one or more improved techniques that make it possible to reduce in size a liquid supply system including a liquid reservoir such as a cartridge while increasing a volume ratio of liquid storable in the liquid reservoir and to restrict air bubbles from entering a head after the liquid stored in the liquid reservoir runs out.

According to aspects of the present disclosure, a liquid ejecting device is provided, which includes a head having a nozzle configured to eject liquid. The liquid ejecting device further includes a container that is connected with the head and is configured to store the liquid. The liquid ejecting device further includes a communication section configured to communicate an internal space of the container with atmosphere. The liquid ejecting device further includes a liquid reservoir configured to store the liquid and to be removably attached to the container. An internal space of the liquid reservoir is communicated with the internal space of the container through a liquid flow path and a gas flow path in an attached state where the liquid reservoir is attached to the container.

According to aspects of the present disclosure, further provided is a liquid reservoir that includes a first reservoir valve disposed at a liquid flow path in an attached state where the liquid reservoir is removably attached to a container of a liquid ejecting device. The liquid reservoir further includes a second reservoir valve disposed at a gas flow path in the attached state. The liquid flow path and the gas flow path are configured to, in the attached state, communicate an internal space of the container with an internal space of the liquid reservoir. The first reservoir valve and the second reservoir valve are configured to change from a closed state into an open state in response to a transition from a separated state where the liquid reservoir is not attached to the container to the attached state. The first reservoir valve and the second reservoir valve are further configured to change from the open state into the closed state in response to a transition from the attached state to the separated state.

Figure 4A:
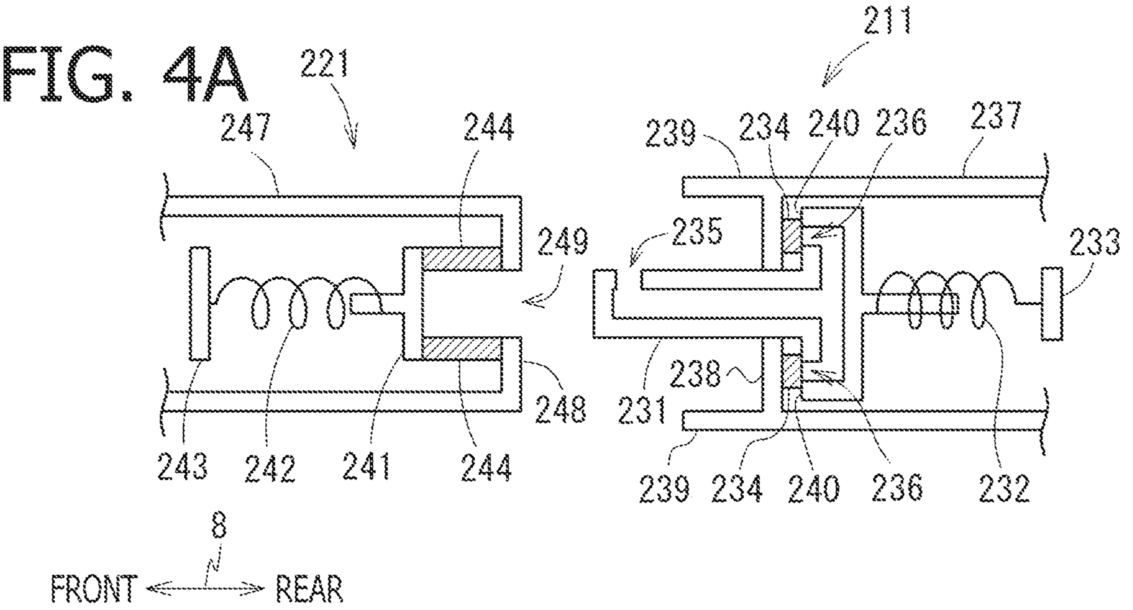

FIG. 4A schematically shows configurations of valves 211 and 221 in a separated state where a cartridge is not attached to a sub tank.

Figure 4B:
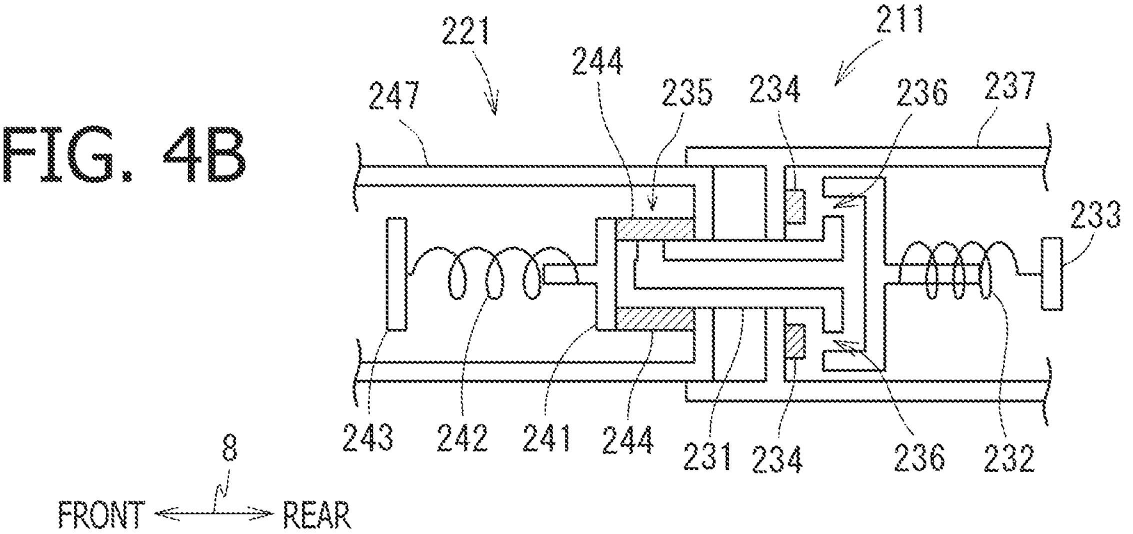

FIG. 4B schematically shows the configurations of the valves 211 and 221 in the middle of transition from the separated state to an attached state where the cartridge is attached to the sub tank.

Figure 4C:
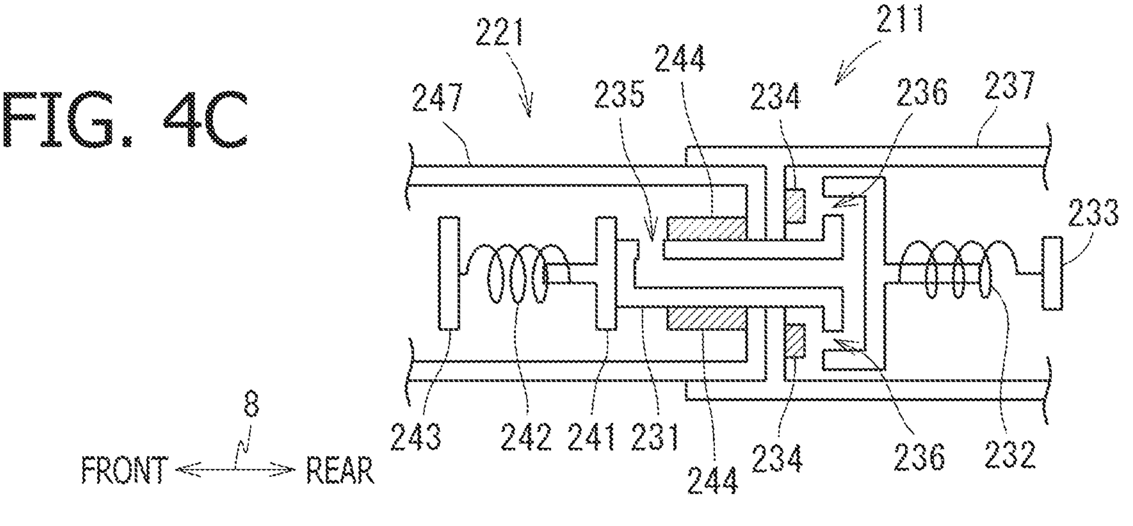

FIG. 4C schematically shows the configurations of the valves 211 and 221 in the attached state.

Figure 5:
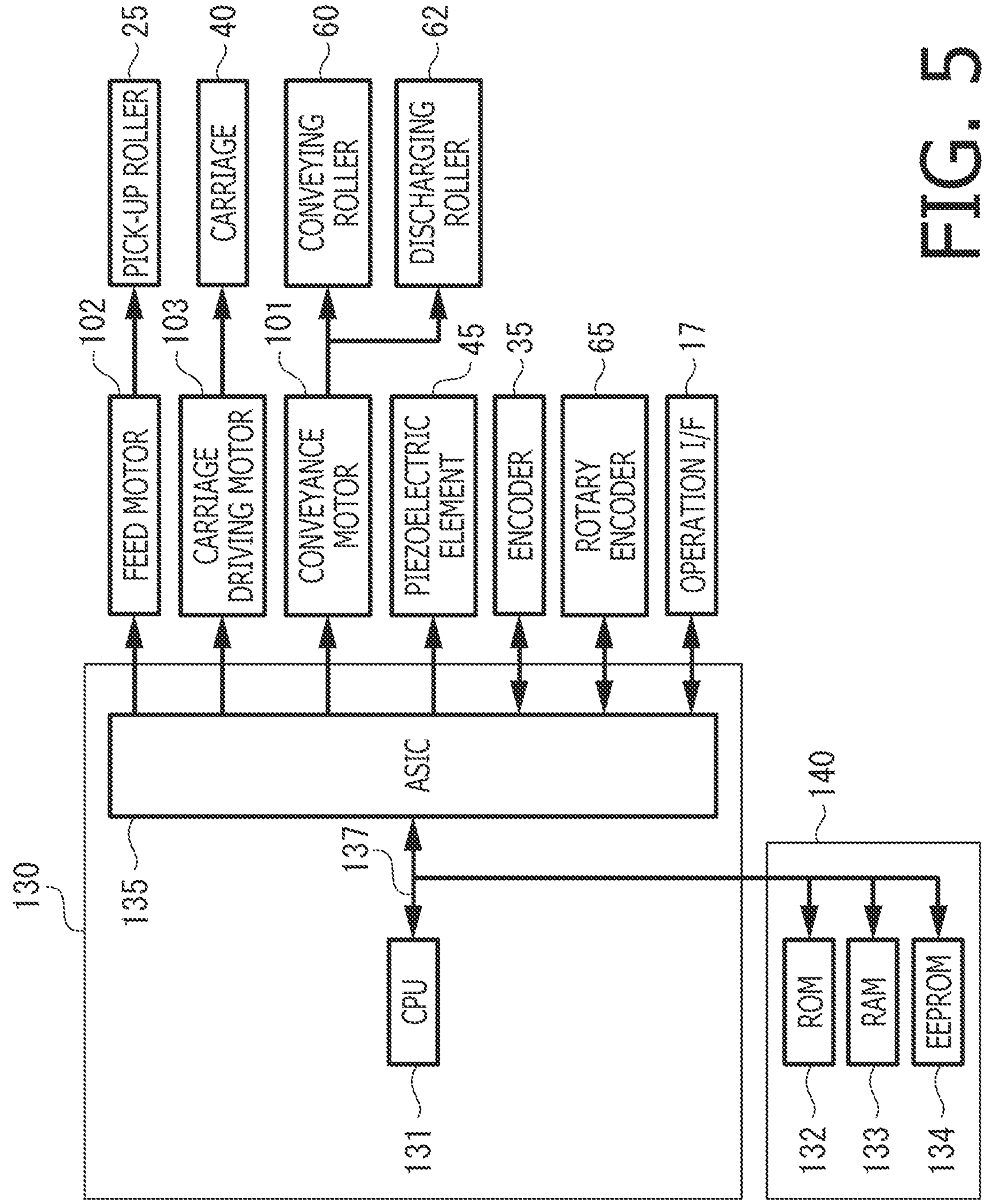

FIG. 5 is a functional block diagram of the MFP.

Figure 6:
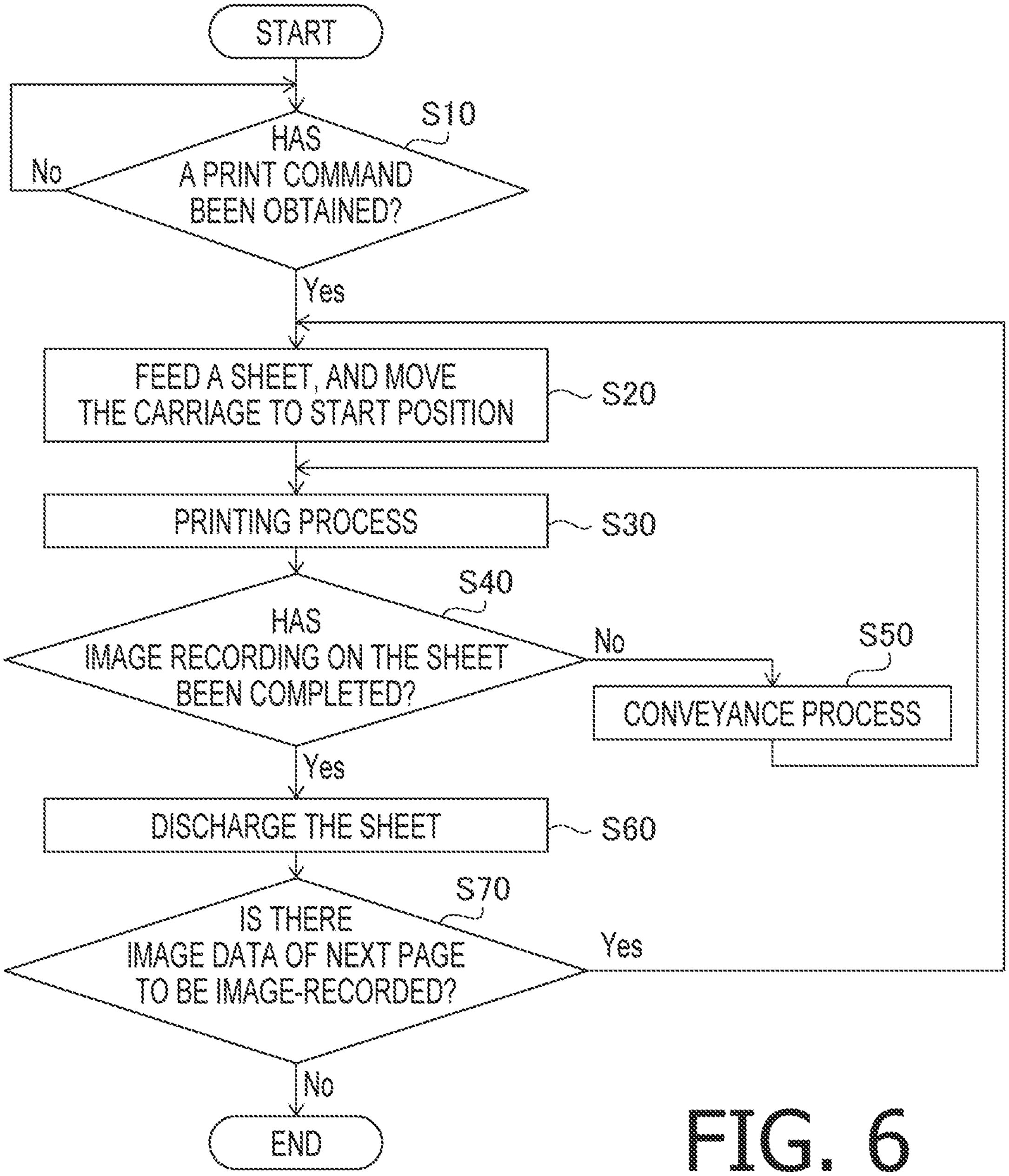

FIG. 6 is a flowchart showing a procedure of image recording control by a controller of the MFP.

Figure 7A:
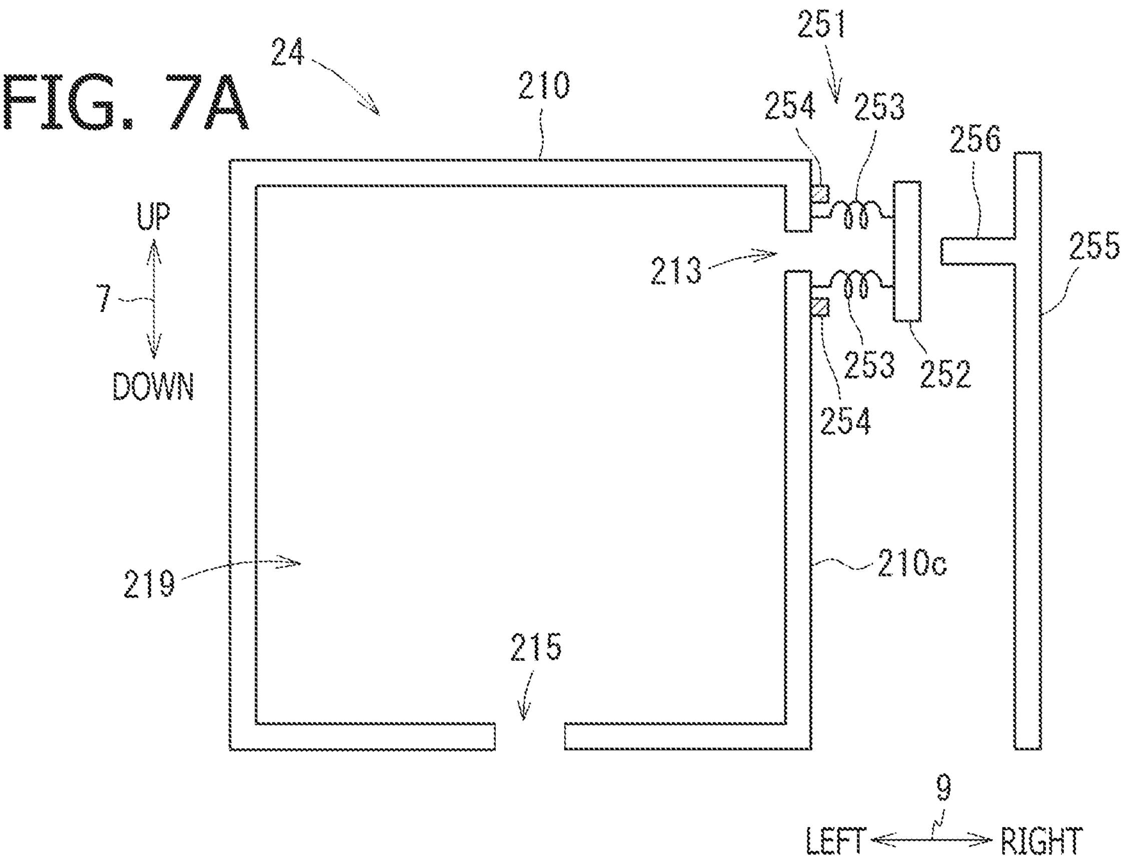

FIG. 7A schematically shows a configuration of a valve 251 of a sub tank.

Figure 7B:
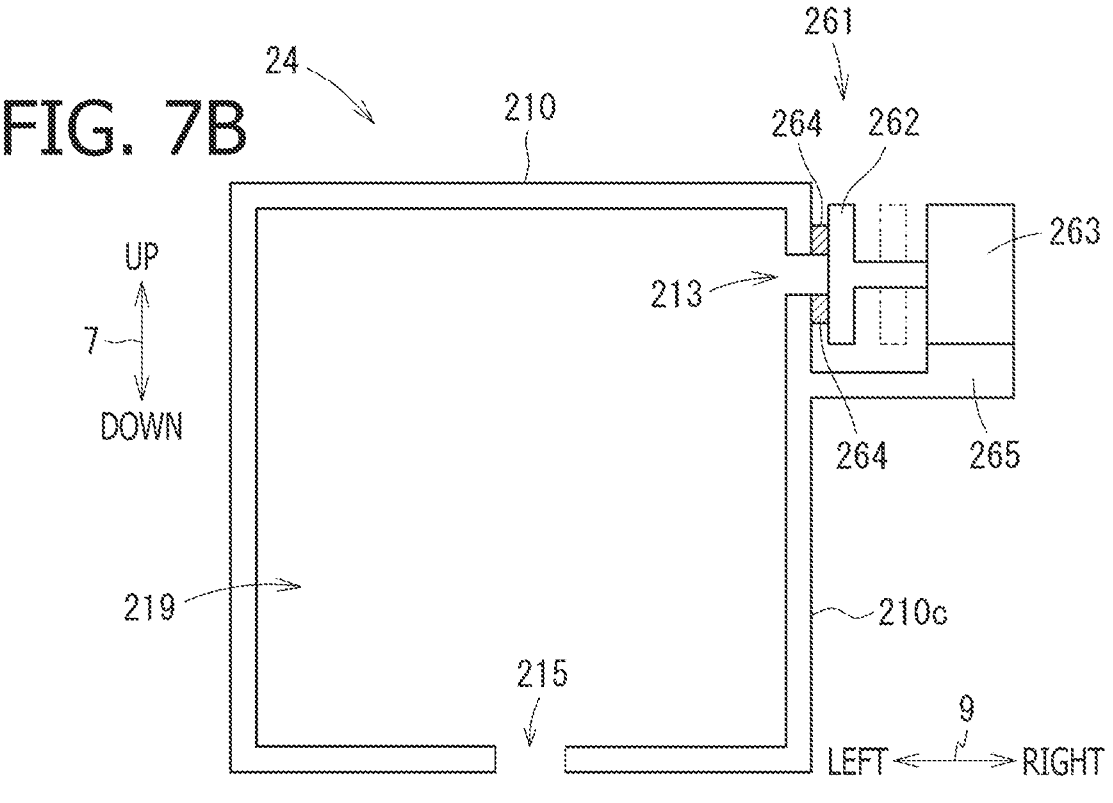

FIG. 7B schematically shows a configuration of a valve 261 of a sub tank.

Figure 8:
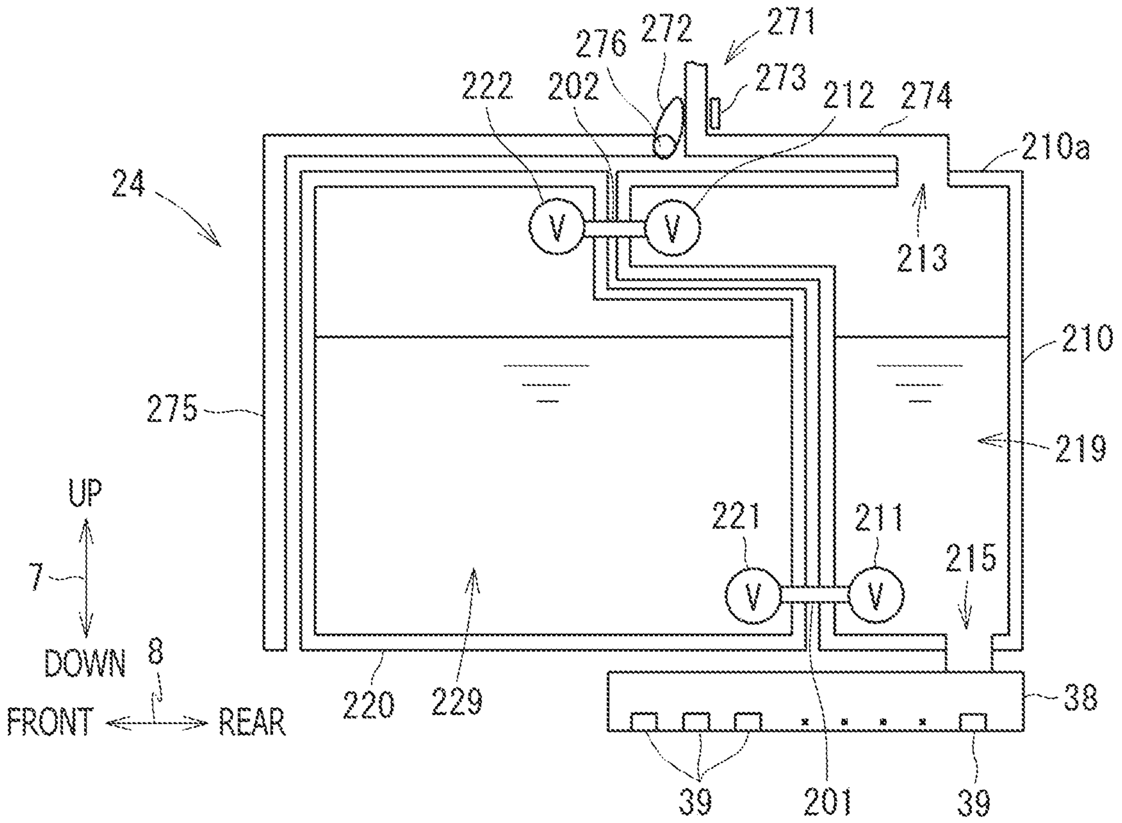

FIG. 8 schematically shows a configuration of a valve 271 of a sub tank when a cover is in a first position.

Figure 9:
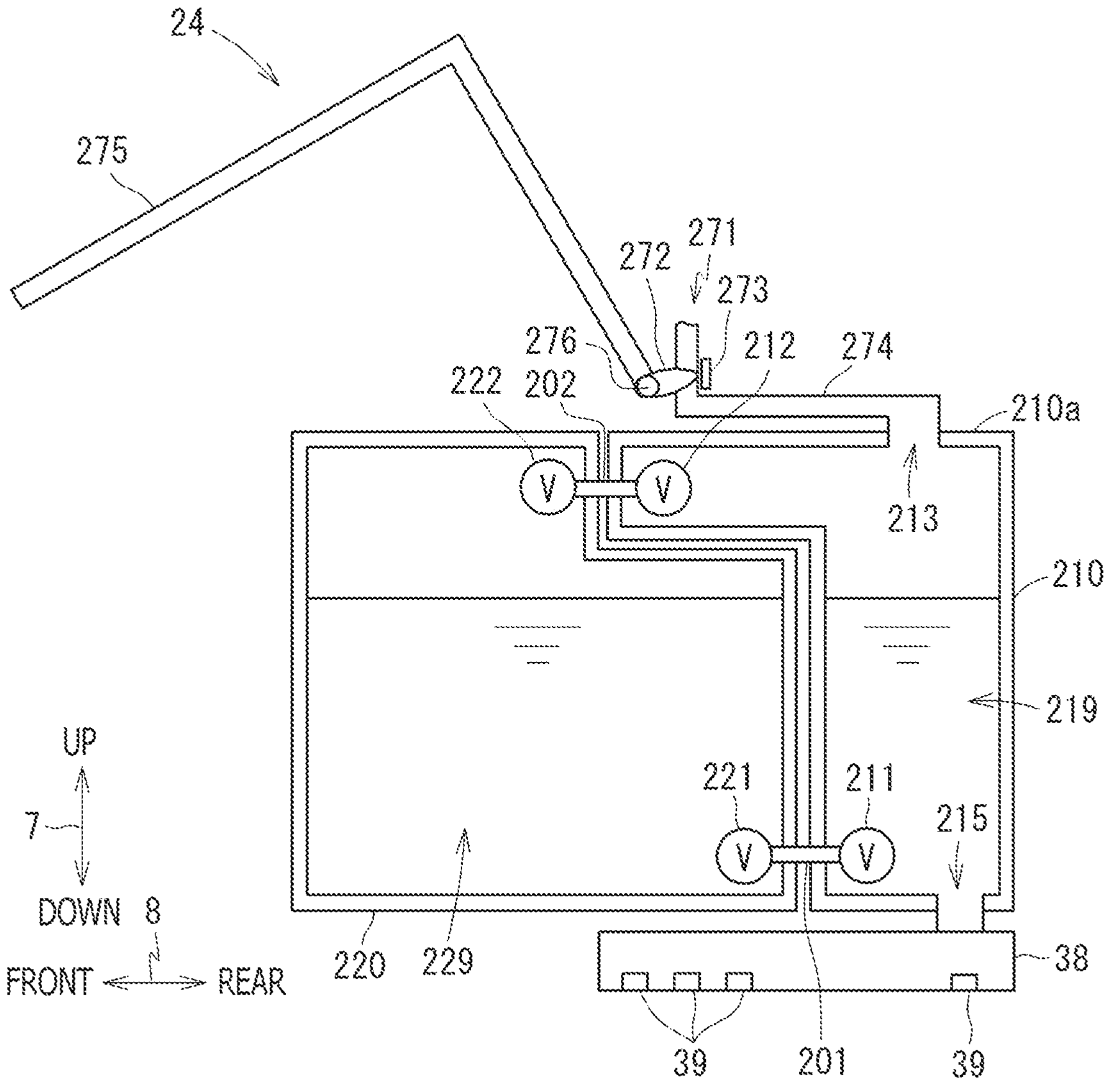

FIG. 9 schematically shows the configuration of the valve 271 of the sub tank when the cover is in a second position.

Figure 10A:
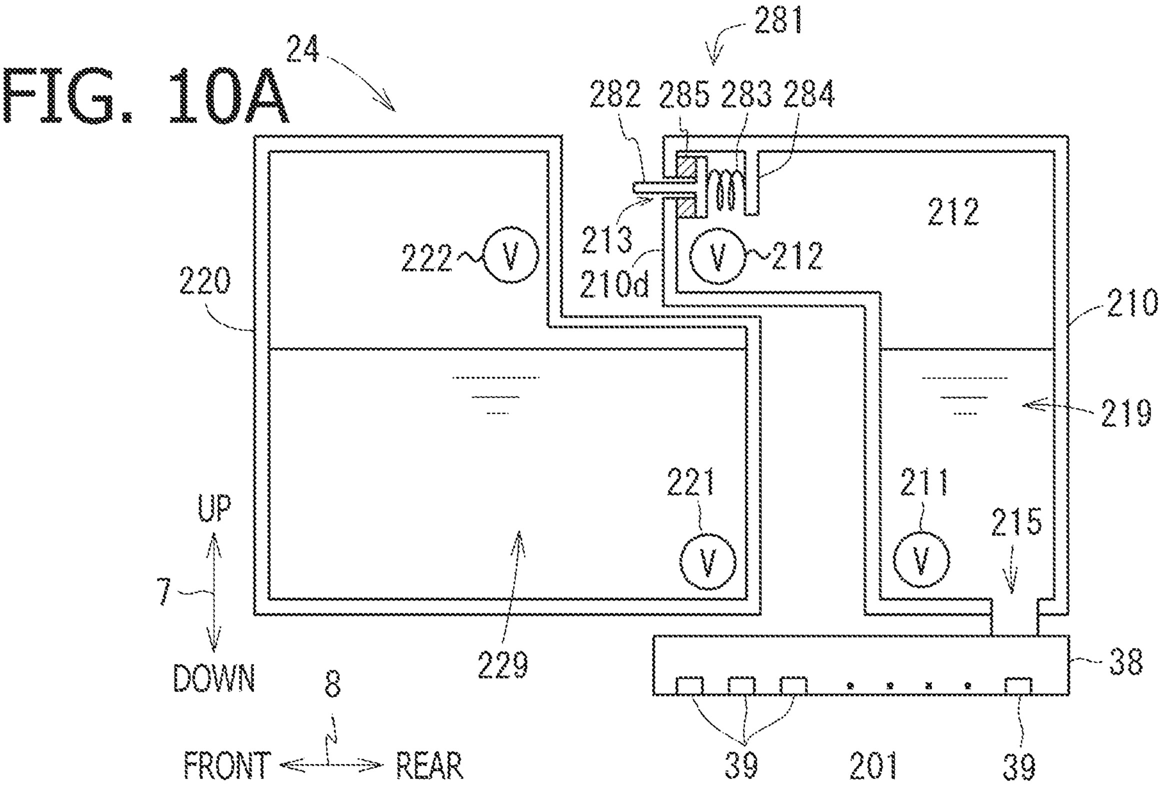

FIG. 10A schematically shows a configuration of a valve 281 of a sub tank in the separated state.

Figure 10B:
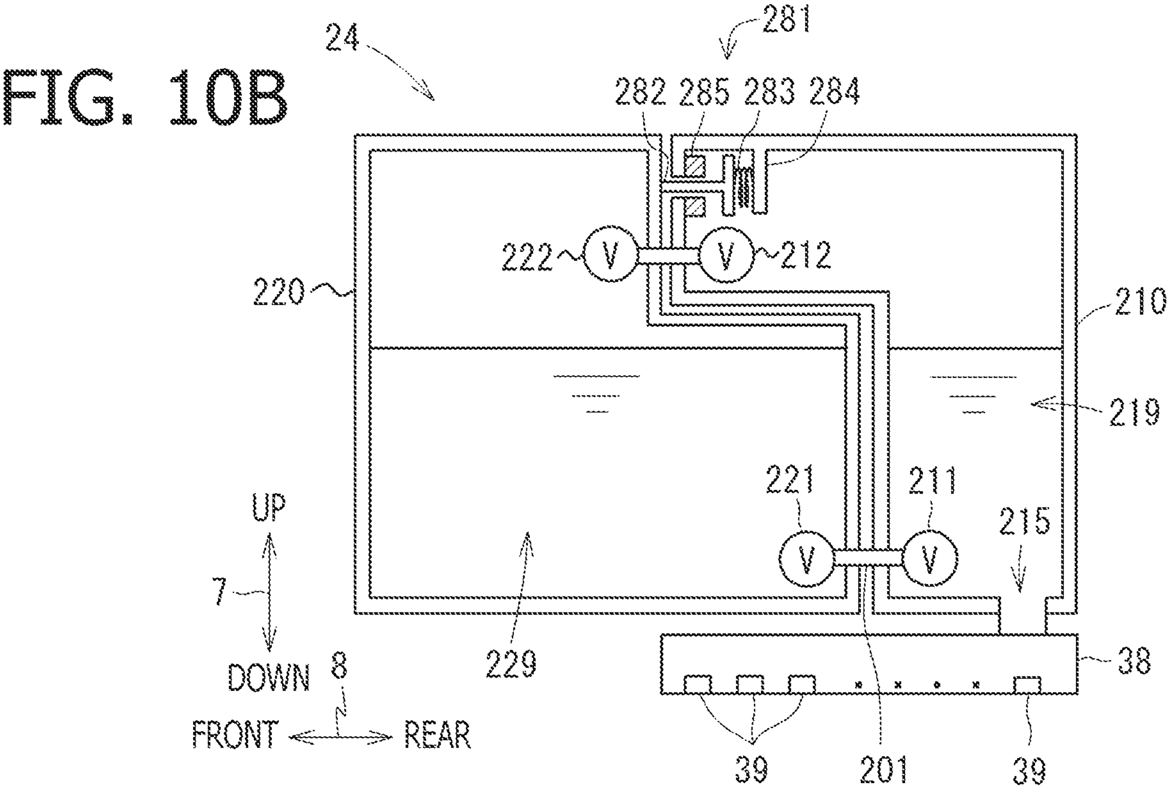

FIG. 10B schematically shows the configuration of the valve 281 of the sub tank in the attached state.

Figure 11:
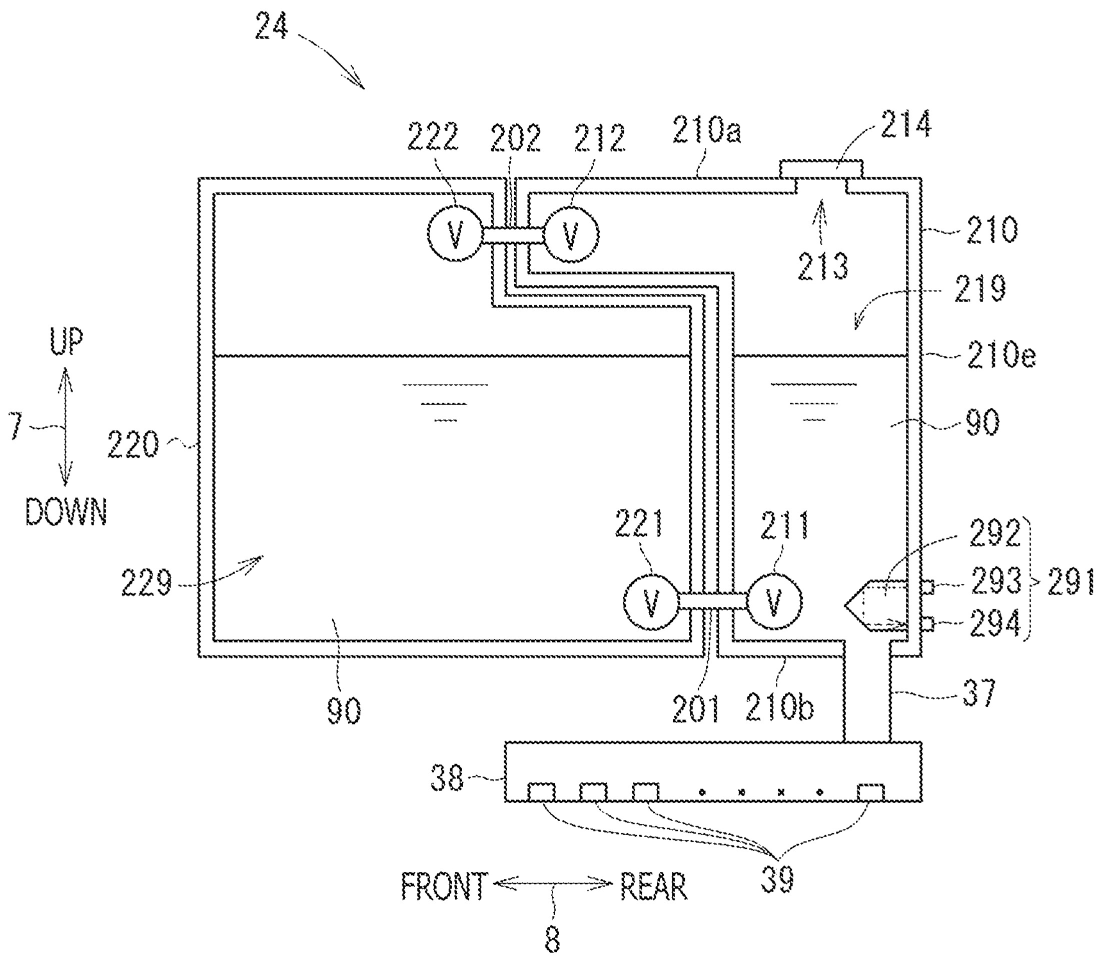

FIG. 11 is a cross-sectional side view, taken along a plane orthogonal to the left-right direction, of a recording device.

Figure 12A:
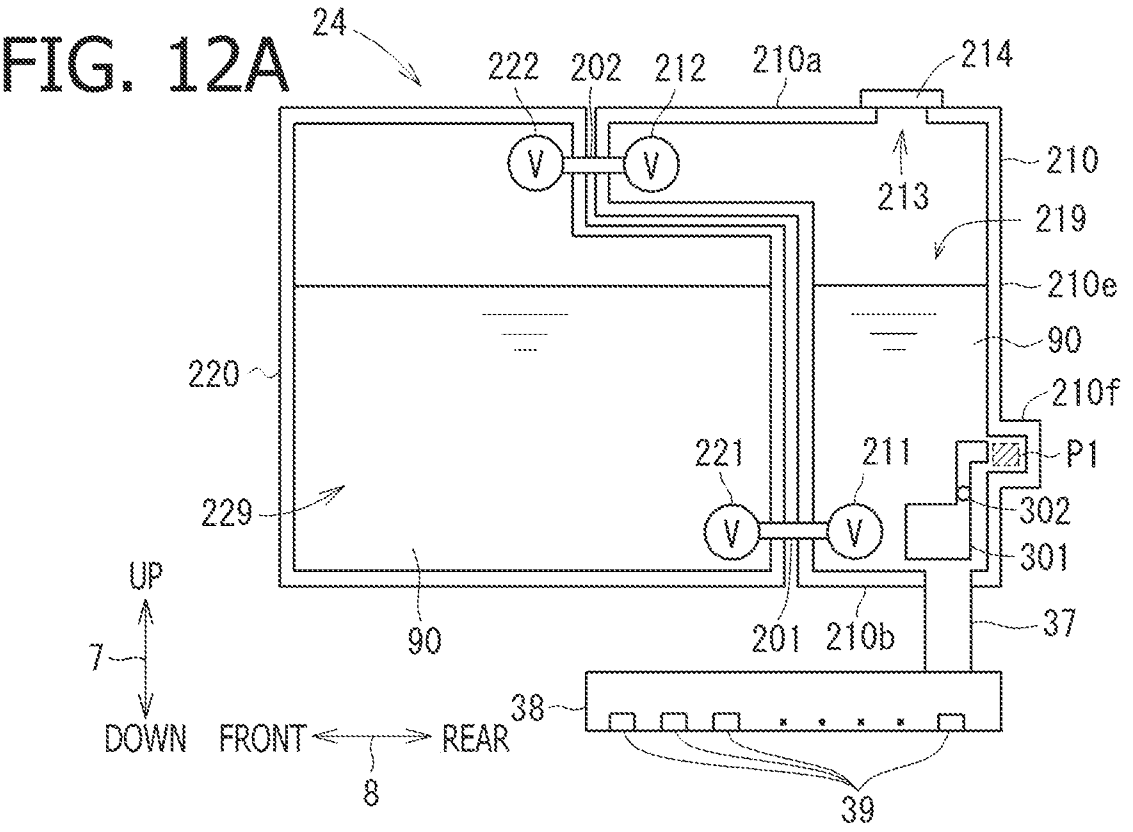

FIG. 12A is a cross-sectional side view, taken along a plane orthogonal to the left-right direction, of a recording device having an actuator and a transmission-type sensor.

Figure 12B:
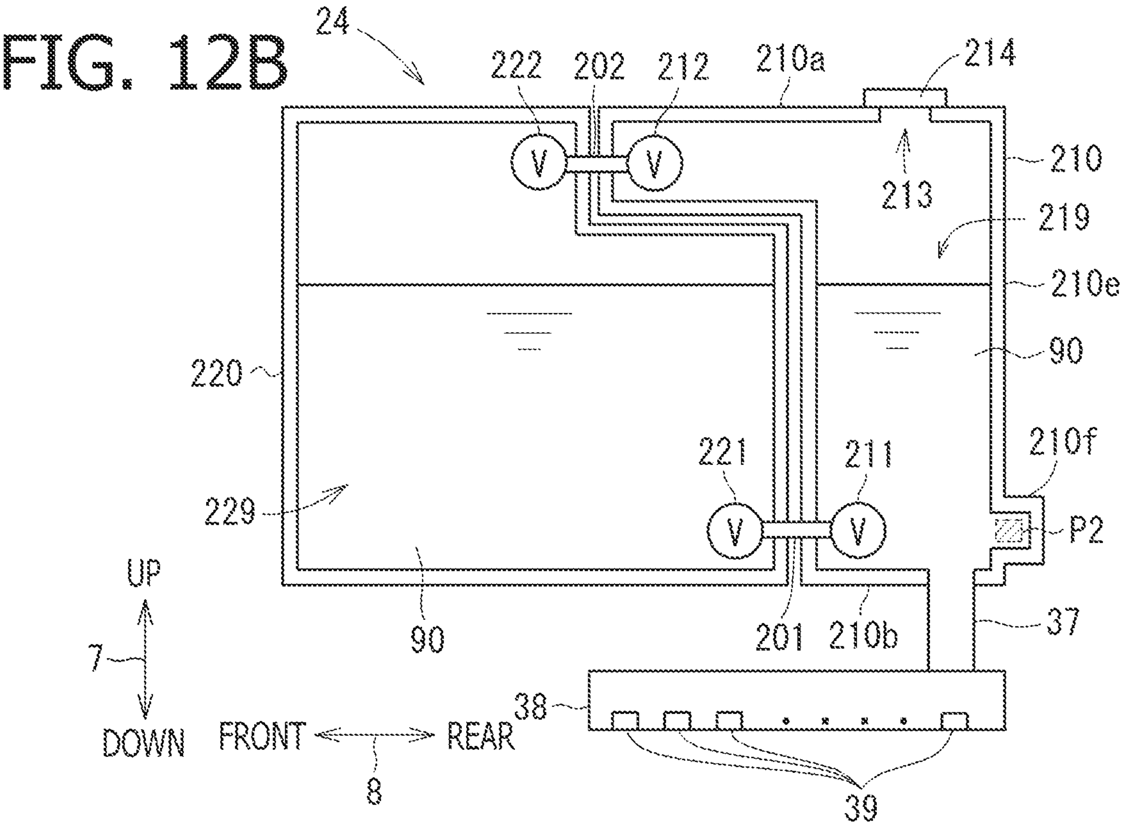

FIG. 12B is a cross-sectional side view, taken along a plane orthogonal to the left-right direction, of a recording device having a transmission-type sensor.

Figure 13:
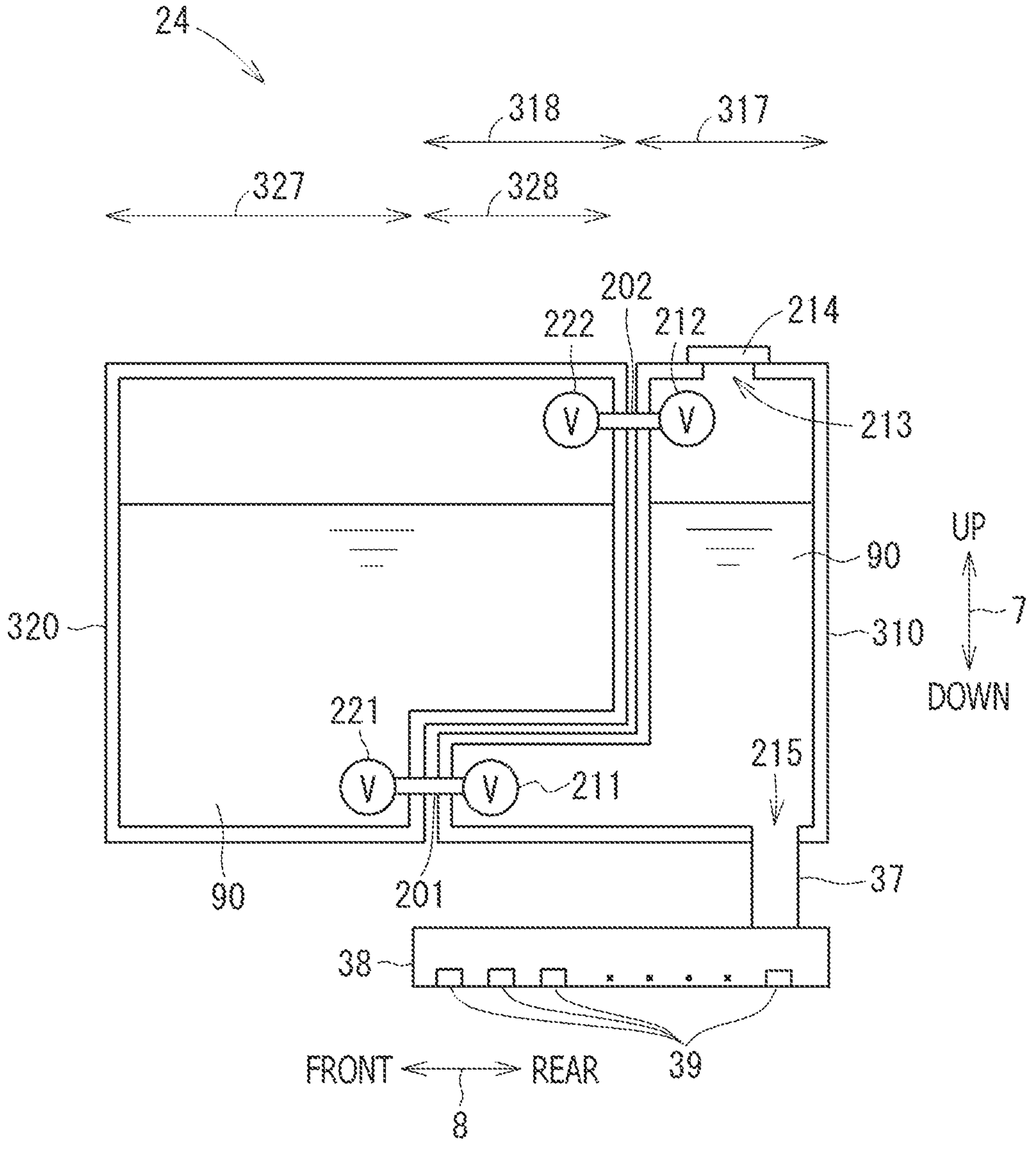

FIG. 13 is a cross-sectional side view, taken along a plane orthogonal to the left-right direction, of a recording device.

Figures 14A, 14B:
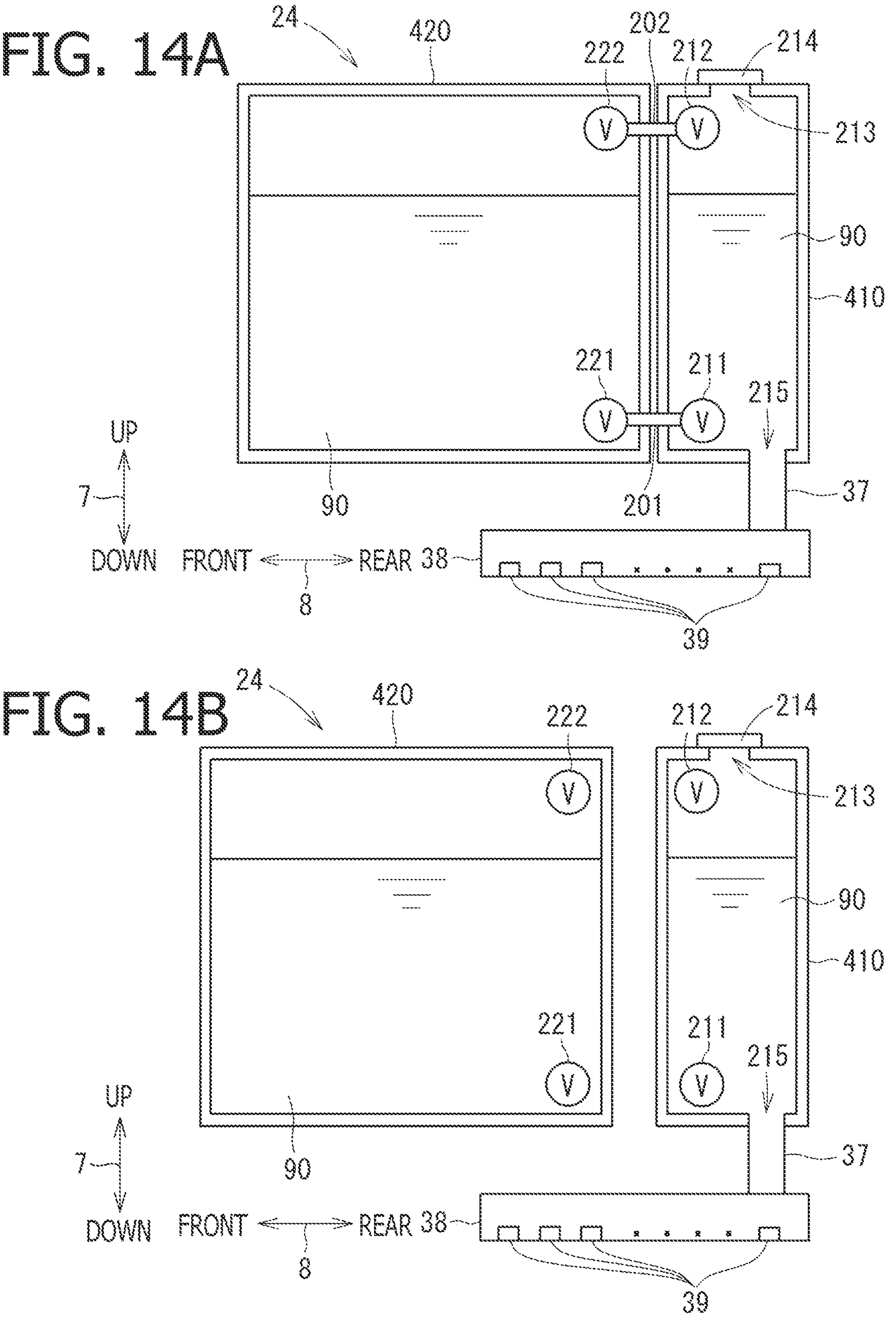

FIG. 14A is a cross-sectional side view, taken along a plane orthogonal to the left-right direction, of a recording device in the attached state.

FIG. 14B is a cross-sectional side view, taken along the plane orthogonal to the left-right direction, of the recording device in the separated state.

Figure 15:
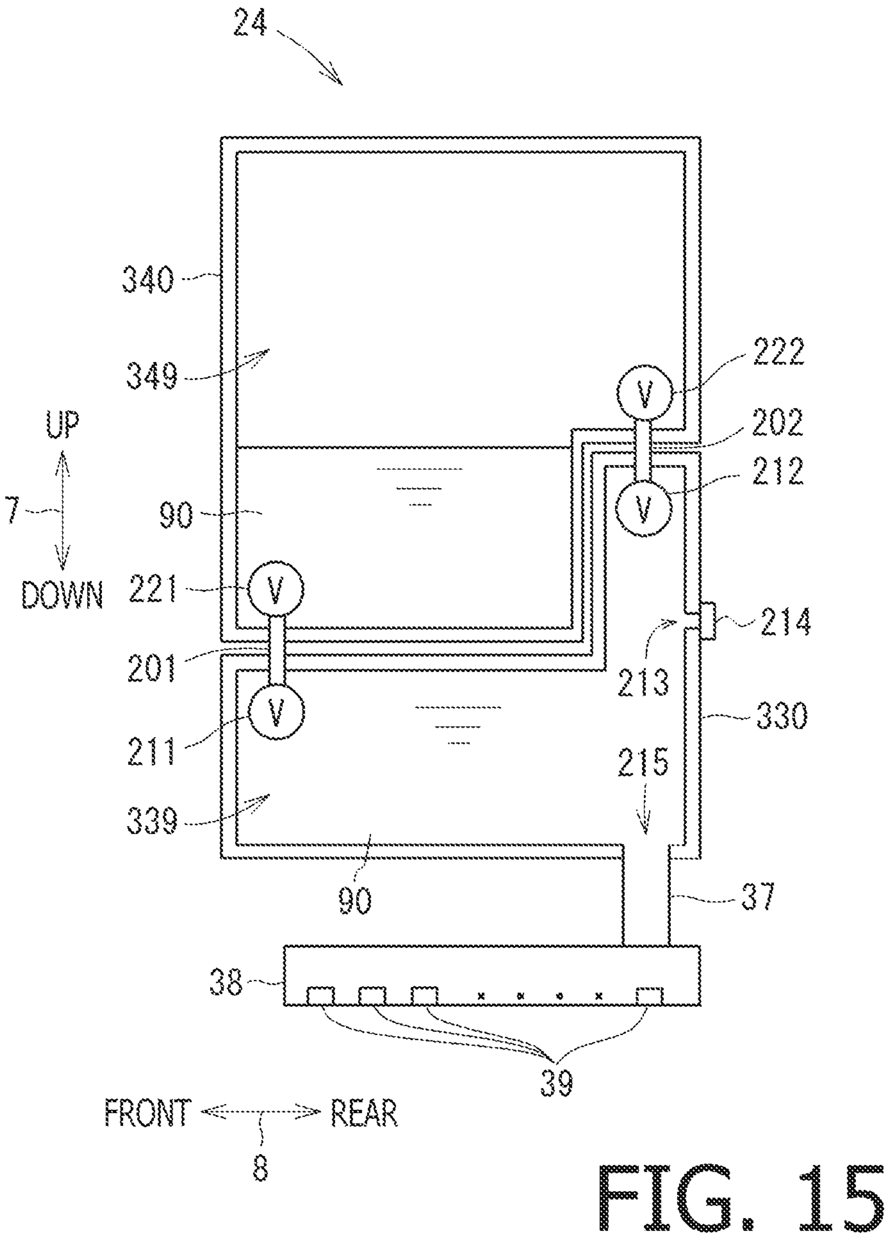

FIG. 15 is a cross-sectional side view, taken along a plane orthogonal to the left-right direction, of a recording device.

Figure 16A:
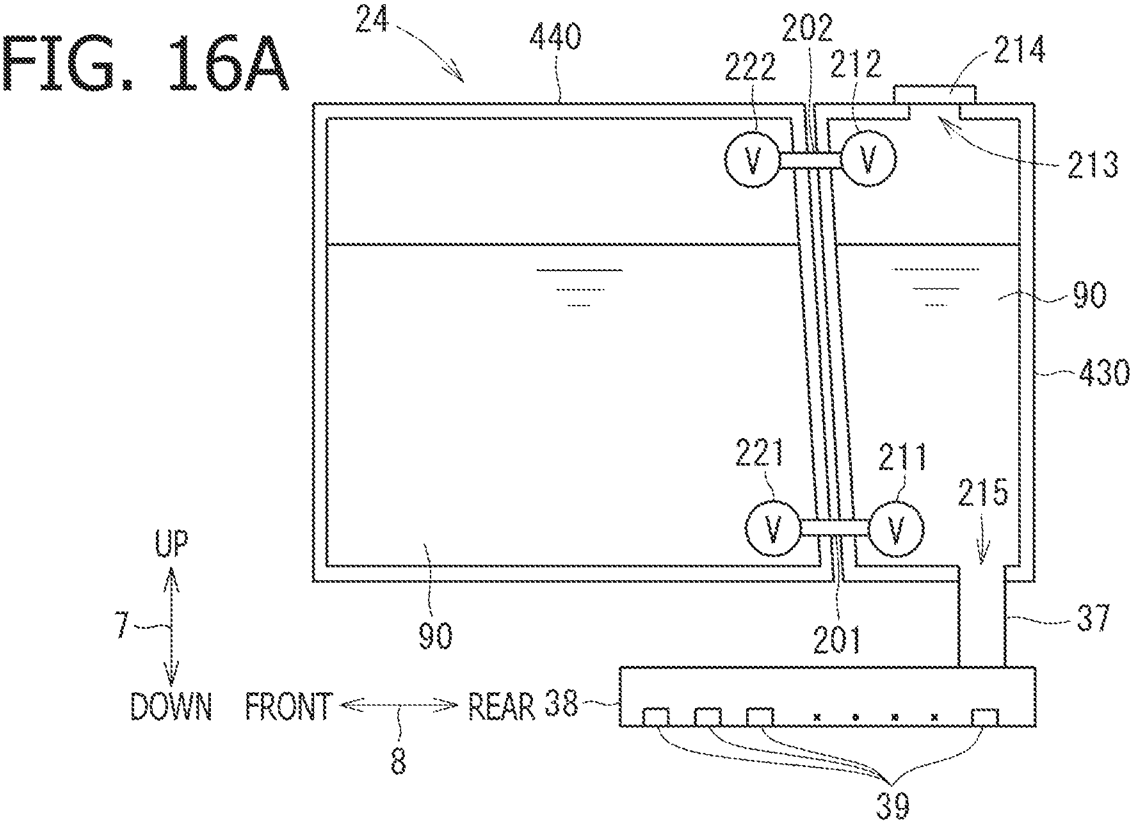

FIG. 16A is a cross-sectional side view, taken along a plane orthogonal to the left-right direction, of a recording device in the attached state.

Figure 16B:
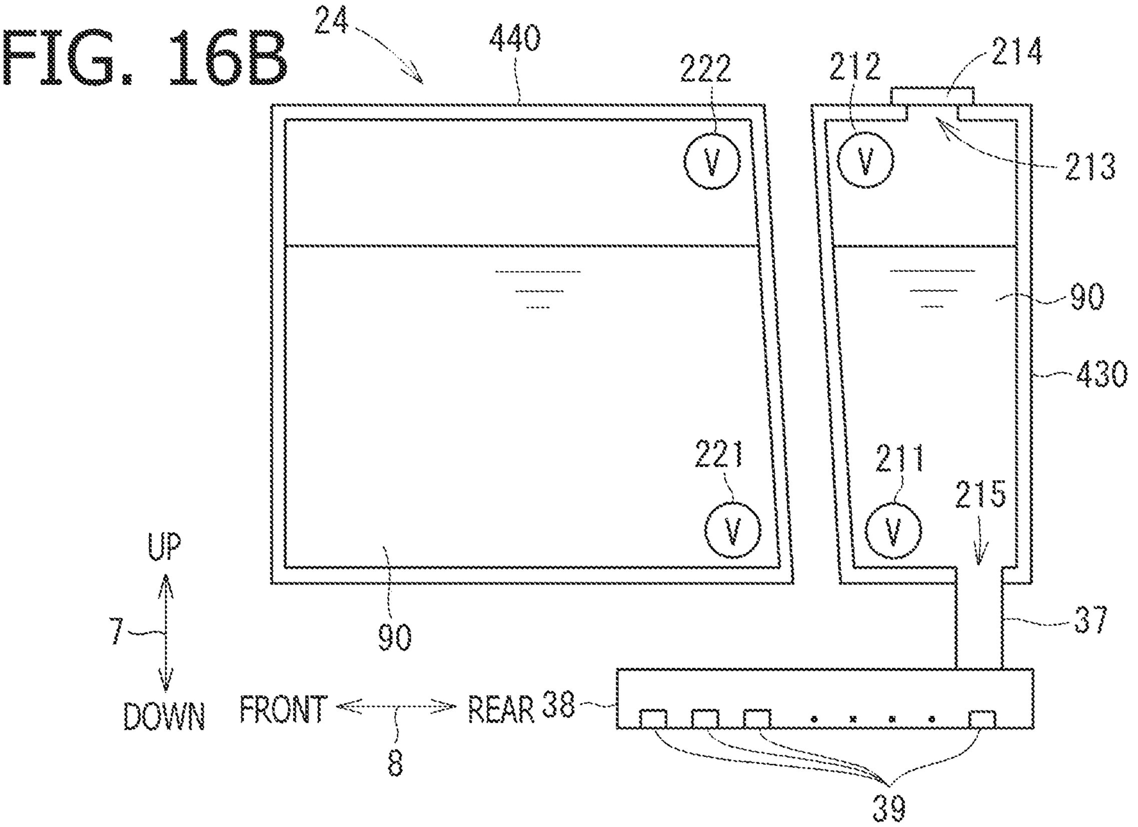

FIG. 16B is a cross-sectional side view, taken along the plane orthogonal to the left-right direction, of the recording device in the separated state.

Figure 17:
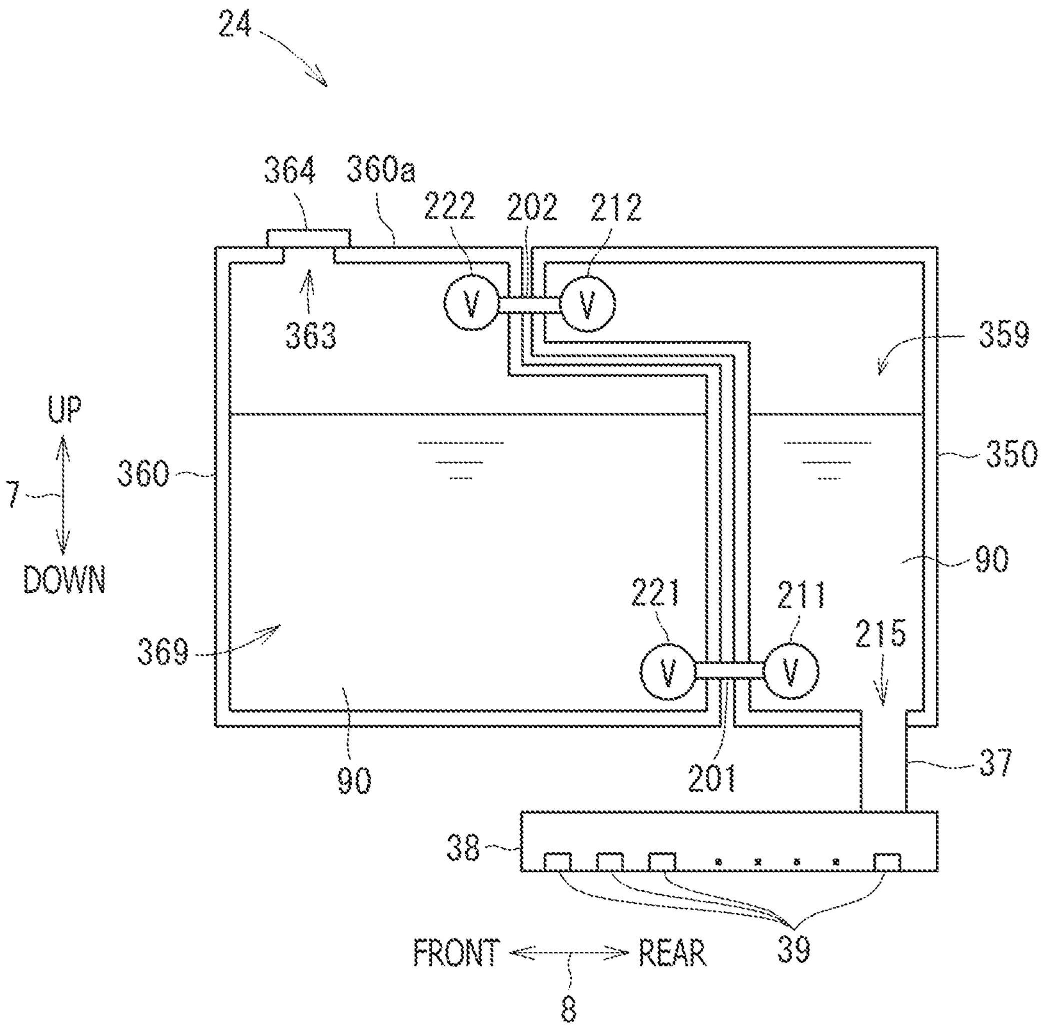

FIG. 17 is a cross-sectional side view, taken along a plane orthogonal to the left-right direction, of a recording device.

Figure 18A:
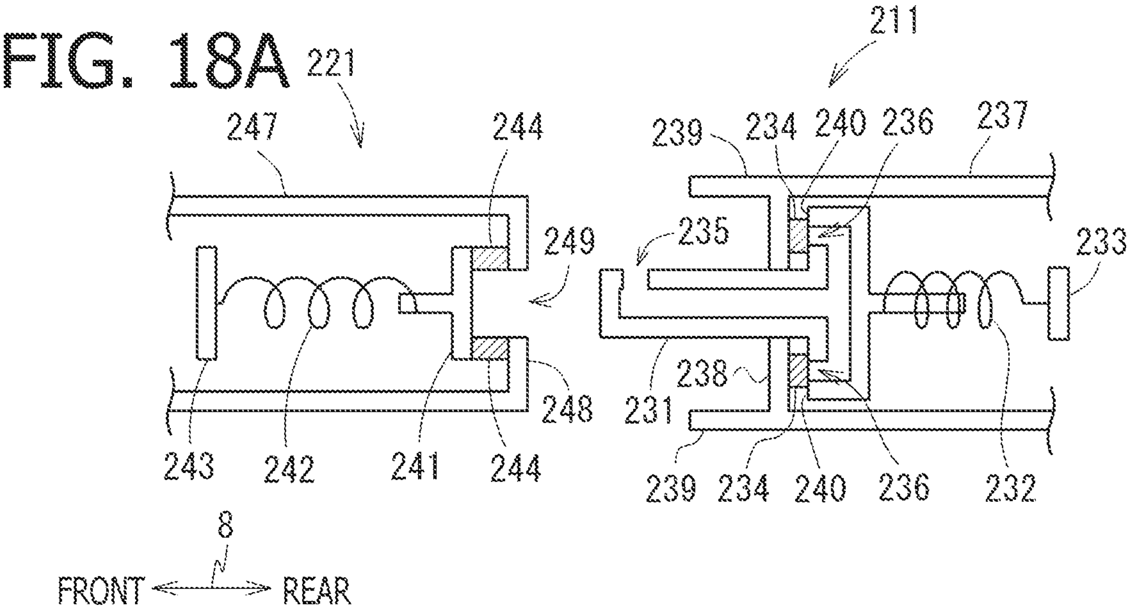

FIG. 18A schematically shows configurations of valves 211 and 221 in the separated state.

Figure 18B:
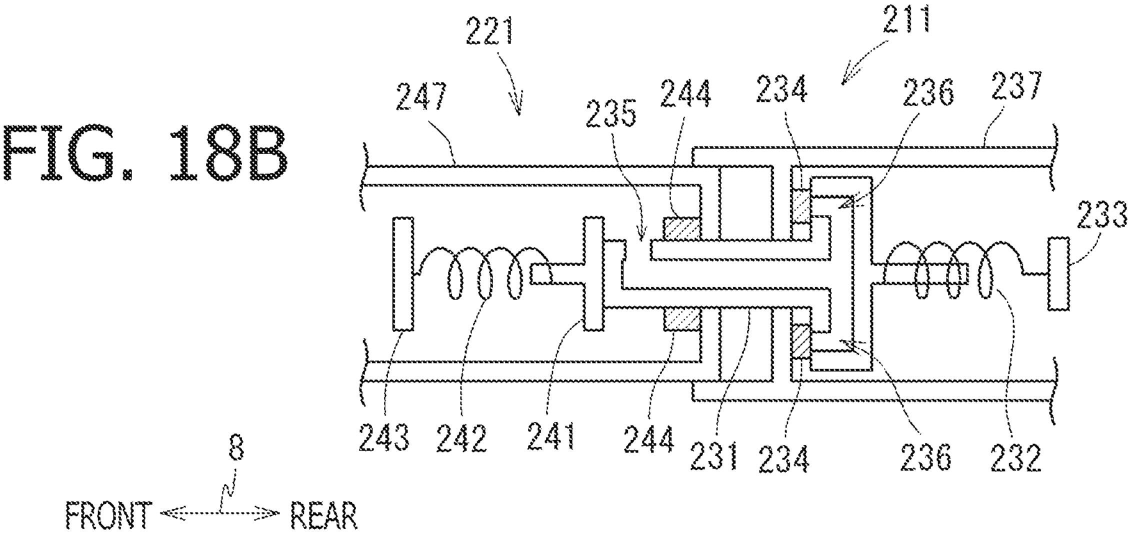

FIG. 18B schematically shows the configurations of the valves 211 and 221 in the middle of transition from the separated state to the attached state.

Figure 18C:
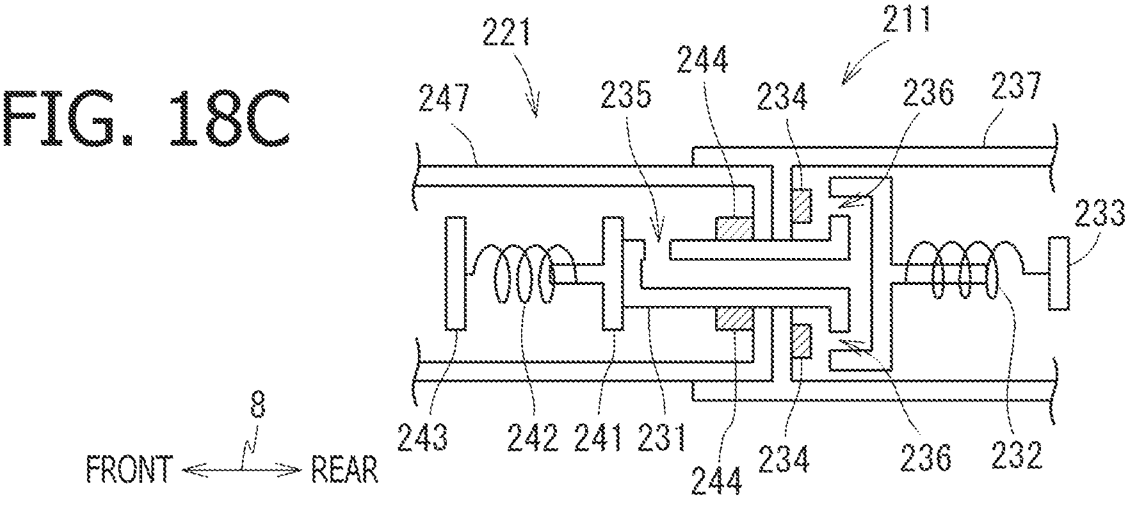

FIG. 18C schematically shows the configurations of the valves 211 and 221 in the attached state.

Figure 19:
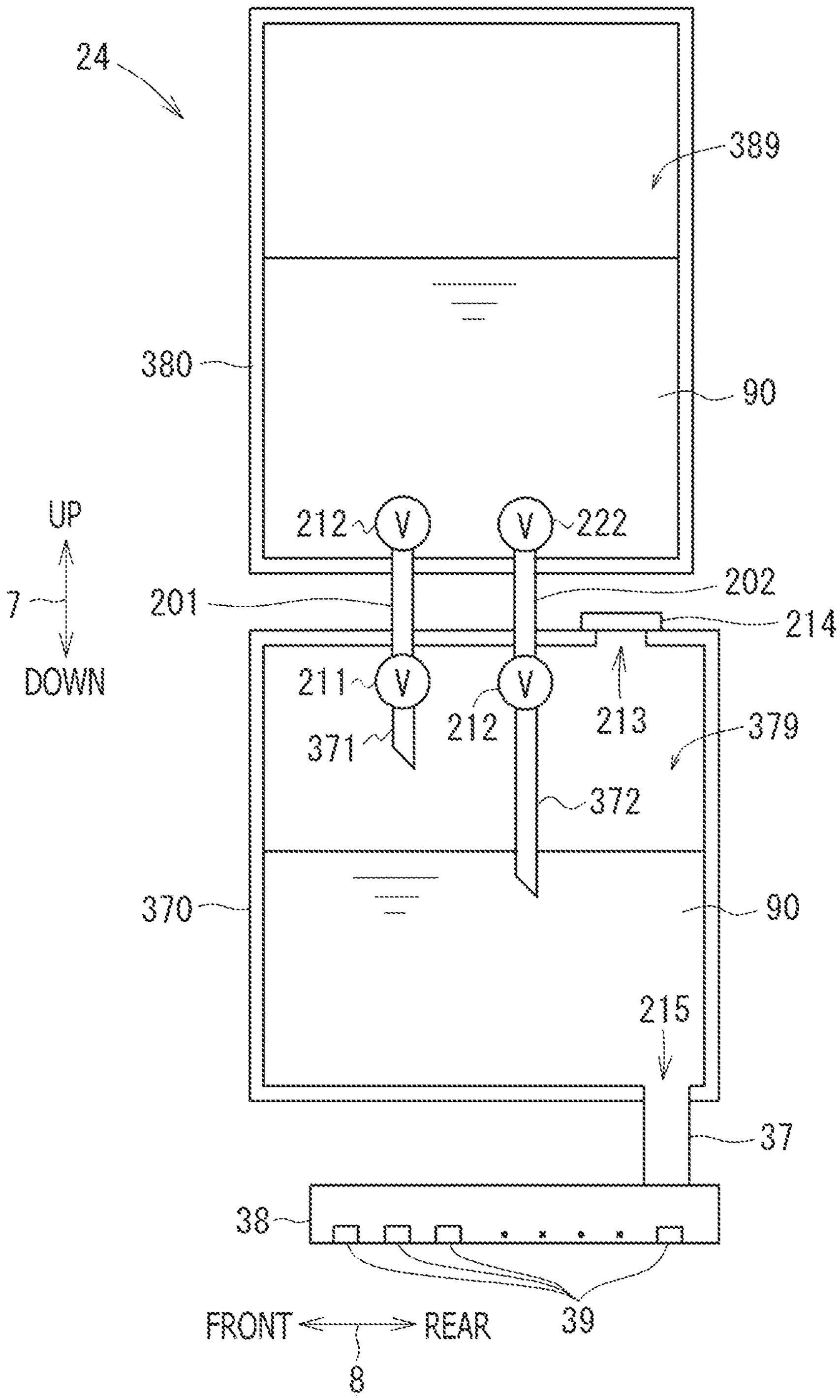

FIG. 19 is a cross-sectional side view, taken along a plane orthogonal to the left-right direction, of a recording device.

Figure 20:
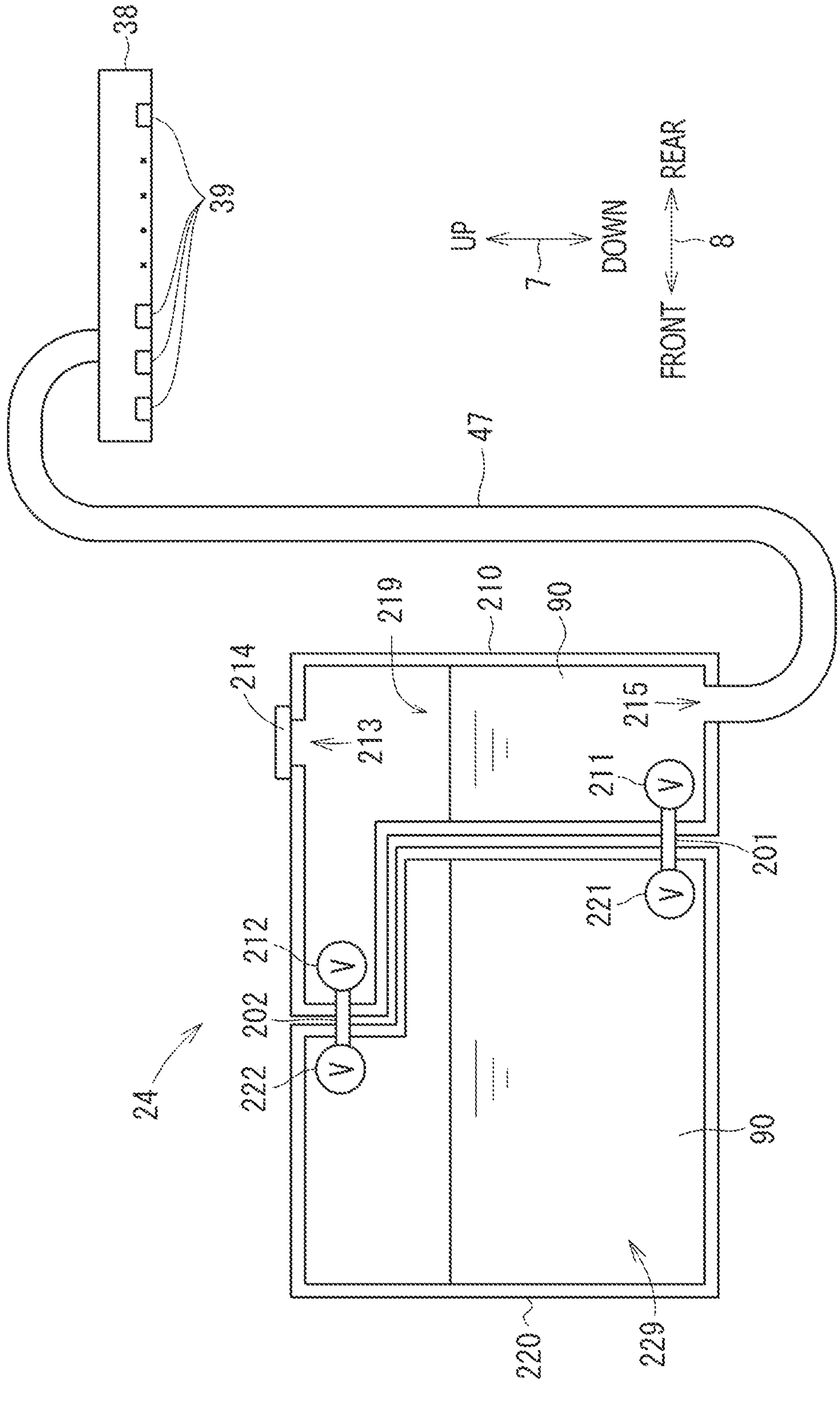

FIG. 20 is a cross-sectional side view, taken along a plane orthogonal to the left-right direction, of a recording device.

Figure 21:
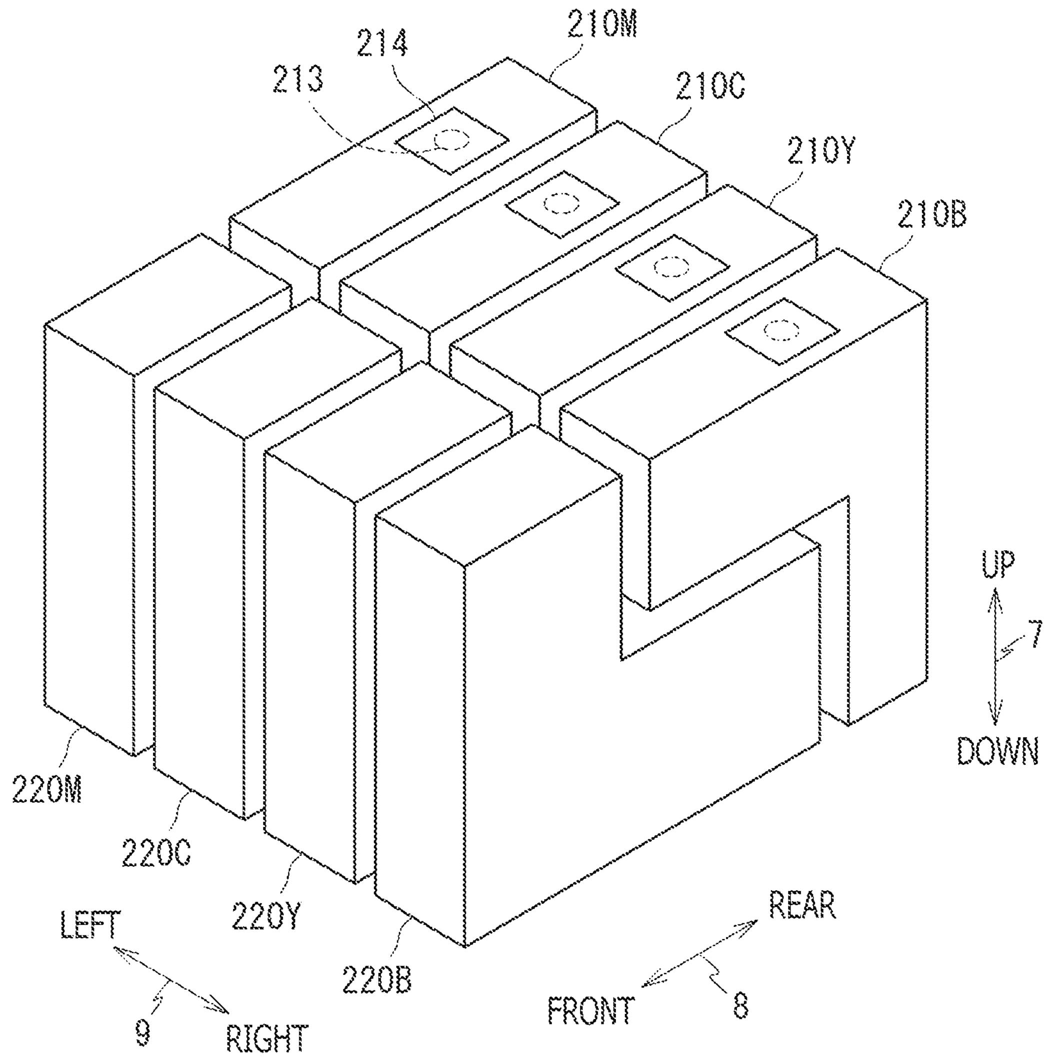

FIG. 21 is a perspective view showing a plurality of sub tanks and a plurality of corresponding cartridges.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
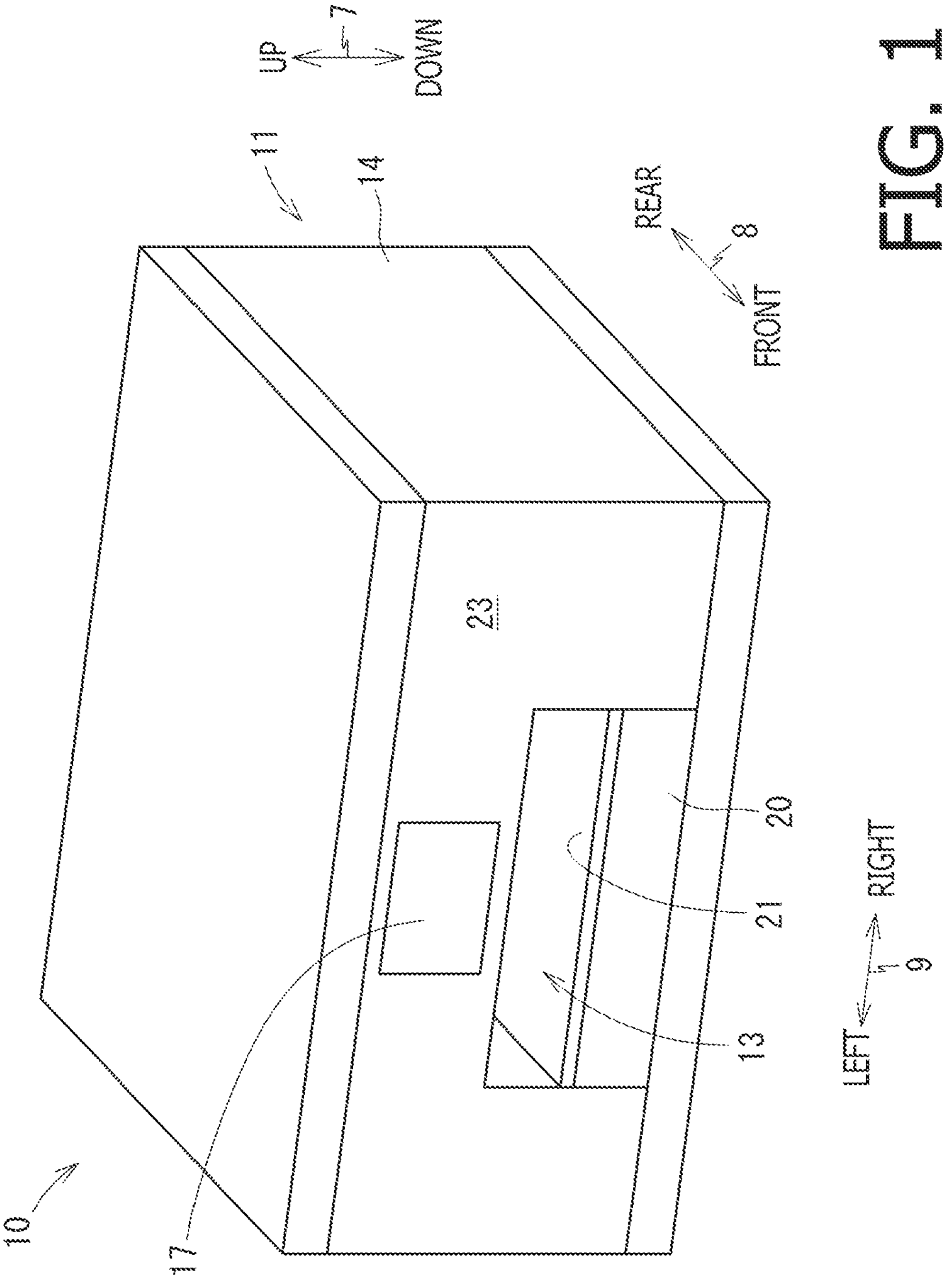
FIG. 1 is a perspective view showing a multi-function peripheral (hereinafter referred to as an “MFP”).

Hereinafter, an illustrative embodiment according to aspects of the present disclosure will be described. It is to be understood that the illustrative embodiment described below is only an example according to aspects of the present disclosure, and is capable of use in various other combinations and environments and is capable of changes or modifications as needed within the scope of the inventive concept as expressed herein (i.e., as long as the gist of the inventive concept is not changed). In the following description, a direction from a starting point to an ending point of an arrow may be expressed as a "direction" or an "orientation." Further, specific directions along a line connecting the starting point and the ending point of the arrow may be simply referred to as a particular "direction." As shown in FIG. 1, a vertical direction 7 may be defined as up-down directions based on a state in which a multi-function peripheral (hereinafter referred to as an "MFP") 10 is installed ready for use. A front-rear direction 8 may be defined as horizontal directions extending from the front (or the rear) to the rear (or the front) with a surface in which an opening 13 is provided as a front face 23. A left-right direction 9 may be defined as horizontal directions extending from the left (or the right) to the right (or the left) when the MFP 10 is viewed from the front. The vertical direction 7, the front-rear direction 8, and the left-right direction 9 are orthogonal to each other.

[Overall Configuration of MFP]

As shown in FIG. 1, the MFP 10 has a housing 14 formed substantially in a rectangular shape. A print engine 11 is disposed at a lower portion of the housing 14. The MFP 10 has various functions such as a facsimile function and a printing function. The MFP 10 has, as the printing function, a function to record an image on one side of a sheet 12 (see FIG. 2) in an inkjet method. It is noted that the MFP 10 may be configured to record images on both sides of the sheet 12. An operation I/F ("I/F" is an abbreviation for "interface") 17 is disposed at an upper portion of the housing 14. The operation I/F 17 includes buttons configured to, when operated, provide an image recording instruction or configure various settings, and a liquid crystal display (hereinafter referred to as an "LCD") configured to display various types of information. In the illustrative embodiment, the operation I/F 17 includes a touch panel that serves as both the buttons and the LCD.

Figure 2:
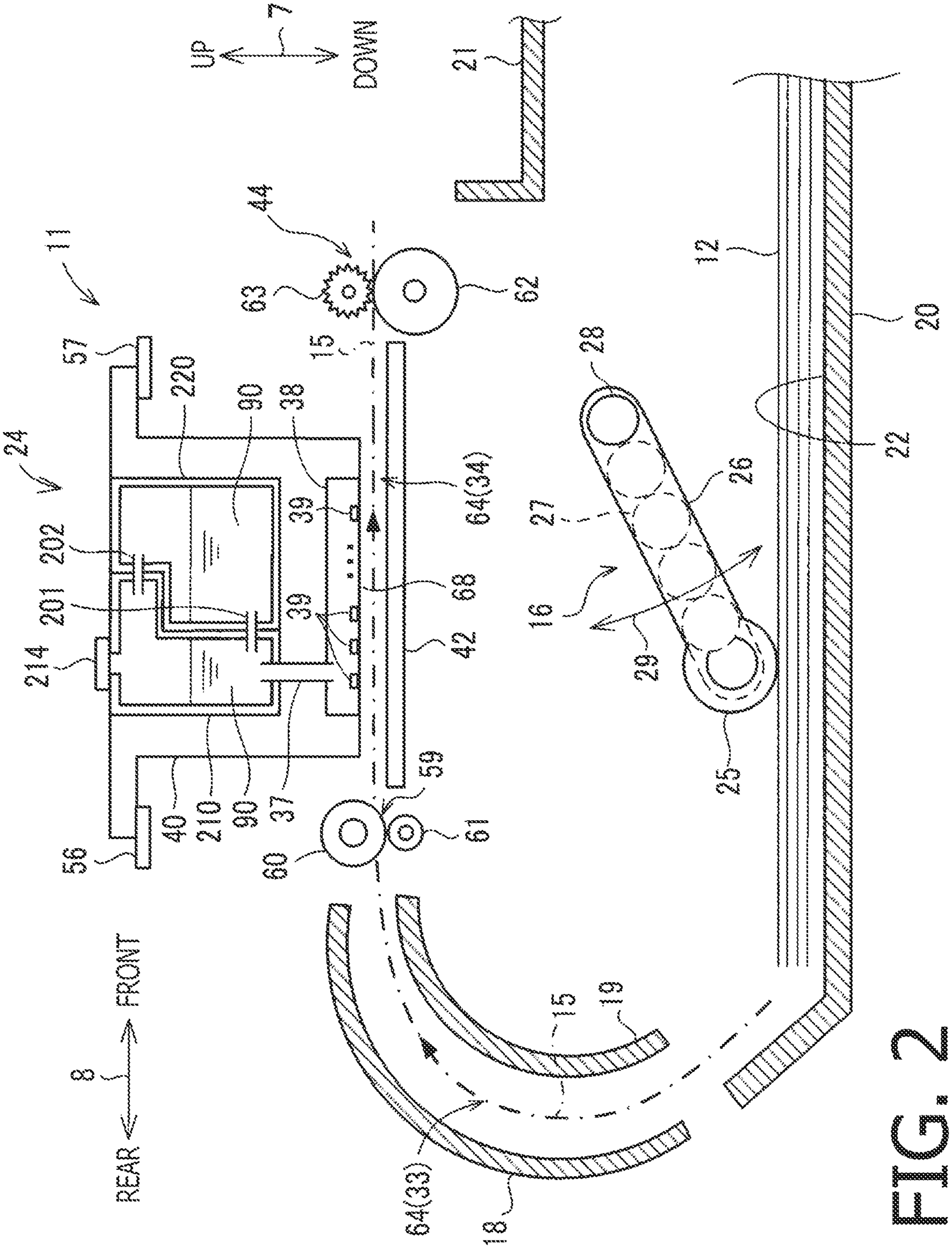
FIG. 2 is a cross-sectional side view schematically showing an internal configuration of a print engine of the MFP.

As shown in FIG. 2, the print engine 11 includes a feed tray 20, a sheet feeder 16, an outer guide member 18, an inner guide member 19, two conveyance rollers 59, two discharge rollers 44, a platen 42, a recording device 24, an encoder 35 (see FIG. 5), a rotary encoder 65 (see FIG. 5), a controller 130 (see FIG. 5), and memories 140 (see FIG. 5). The above elements included in the print engine 11 are disposed inside the housing 14. Inside the housing 14, there are various status sensors (not shown) disposed that are configured to detect statuses of the MFP 10 and output signals according to detection results.

[Feed Tray]

As shown in FIG. 1, an opening 13 is formed in the front face 23 of the print engine 11. The feed tray 20 is movable to a feeding position (i.e., a position shown in FIGS. 1 and 2) where the feed tray 20 is attached to the housing 14 and to a non-feeding position where the feed tray 20 is removed from the housing 14. The feed tray 20 moves to the feeding position by being inserted rearward, into the housing 14. The feed tray 20 moves to the non-feeding position by being pulled frontward out of the housing 14.

The feed tray 20 is formed in a box shape with an upper side opened. The feed tray 20 is configured to accommodate one or more sheets 12 set therein. More specifically, as shown in FIG. 2, the feed tray 20 includes a bottom plate 22 configured to support a stack of sheets 12 placed thereon. A discharge tray 21 is disposed above a front portion of the feed tray 20. The discharge tray 21 is configured to receive and support a sheet 12, on which an image has been recorded by the recording device 24, discharged onto an upper surface of the discharge tray 21. When the feed tray 21 is in the feeding position, the sheet(s) 12 supported by the feed tray 20 are allowed to be fed to a conveyance path 64.

[Sheet Feeder]

As shown in FIG. 2, the sheet feeder 16 is disposed below the recording device 24 and above the bottom plate 22 of the feed tray 20. The sheet feeder 16 includes a pick-up roller 25, a pick-up arm 26, a drive transmission mechanism 27, and a shaft 28. The pick-up roller 25 is rotatably supported at a distal end portion of the pick-up arm 26. The pick-up arm 26 is rotatable in directions indicated by an arrow 29 around the shaft 28 disposed at a base end portion of the pick-up arm 26. Thereby, the pick-up roller 25 is enabled to be brought into contact with and separated from the feed tray 20 or a topmost one of the sheets 12 supported by the feed tray 20.

The pick-up roller 25 is configured to rotate by a driving force transmitted from a feed motor 102 (see FIG. 5) via the drive transmission mechanism 27. Thereby, the topmost sheet 12 in contact with the pick-up roller 25, among the sheets 12 supported by the bottom plate 22 of the feed tray 20 in the feeding position, is fed to the conveyance path 64. For instance, the drive transmission mechanism 27 includes a plurality of intermeshing gears. Instead, in another instance, the drive transmission mechanism 27 may include a belt wound around the shaft 28 and a shaft of the pick-up roller 25.

[Conveyance Path]

As shown in FIG. 2, the conveyance path 64 extends from a rear end portion of the feed tray 20. The conveyance path 64 includes a curved section 33 and a straight section 34. The curved section 33 extends upward and further extends to make a U-turn from the rear to the front. The straight section 34 extends substantially along the front-rear direction 8.

The curved section 33 is formed by an outer guide member 18 and an inner guide member 19 that face each other across a particular distance. The outer guide member 18 and the inner guide member 19 extend in the left-right direction 9. The straight section 34 is formed by the recording device 24 and the platen 42 that face each other across a particular distance, in a position where the recording device 24 is located.

A sheet 12 supported on the feed tray 20 is fed by the pick-up roller 25 and conveyed along the curved section 33 to reach the conveyance rollers 59. The sheet 12 held by the conveyance rollers 59 is conveyed forth toward the recording device 24 along the straight section 34. Then, after the sheet 12 has reached directly under the recording device 24, image recording is performed on the sheet 12 by the recording device 24. The sheet 12 with the image recorded is further conveyed forward along the straight section 34 and discharged onto the discharge tray 21. Thus, the sheet 12 is conveyed in a conveyance direction 15 which is indicated in FIG. 2 by an arrow with an alternate long and short dash line.

[Conveyance Rollers and Discharge Rollers]

As shown in FIG. 2, the conveyance rollers 59 are disposed to face each other across the straight section 34. The discharge rollers 44 are disposed downstream of the conveyance rollers 59 in the conveyance direction 15 along the straight section 34.

The conveyance rollers 59 include a conveying roller 60 and a pinch roller 61. The pinch roller 61 is disposed below and opposed to the conveying roller 60. The pinch roller 61 is pressed against the conveying roller 60 by an elastic member (not shown) such as a coil spring. The conveyance rollers 59 are configured to hold the sheet 12 therebetween.

The discharge rollers 44 include a discharging roller 62 and a spur roller 63. The spur roller 63 is disposed above and opposed to the discharging roller 62. The spur roller 63 is pressed against the discharging roller 62 by an elastic member (not shown) such as a coil spring. The discharge rollers 44 are configured to hold the sheet 12 therebetween.

The conveying roller 60 and the discharging roller 62 are configured to rotate by a driving force from a conveyance motor 101 (see FIG. 5). When the conveying roller 60 is rotated with the sheet 12 being held between the conveyance rollers 59, the sheet 12 is conveyed in the conveyance direction 15 by the conveyance rollers 59 and fed onto the platen 42. When the discharging roller 62 is rotated with the sheet 12 being held between the discharge rollers 44, the sheet 12 is conveyed in the conveyance direction 15 by the discharge rollers 44 and discharged onto the discharge tray 21. A common motor may be used as the conveyance motor 101 and the feed motor 102. In this case, a drive transmission path from the common motor to each roller may be switchable.

What is usable for conveying the sheet 12 is not limited to the aforementioned rollers such as the conveyance rollers 59 and the discharge rollers 44. For instance, a conveyance belt may be used instead of the conveyance rollers 59 and the discharge rollers 44.

[Platen]

As shown in FIG. 2, the platen 42 is disposed along the straight section 34 of conveyance path 64. The platen 42 is opposed to the recording device 24 in the vertical direction 7. The platen 42 is configured to support, from beneath, the sheet 12 being conveyed along the conveyance path 64. The sheet 12 being conveyed along the conveyance path 64 passes over an area (hereinafter referred to as a "media passing area") between a right end and a left end of the platen 42 in the left-right direction 9.

[Recording Device]

As shown in FIG. 2, the recording device 24 is disposed above and opposed to the platen 42. The recording device 24 includes a carriage 40, a head 38, and a sub tank 210. A cartridge 220 with ink 90 stored is removably attached to the sub tank 210.

The carriage 40 is supported by two guide rails 56 and 57 to be movable along the left-right direction 9 orthogonal to the conveyance direction 15. The two guide rails 56 and 57 are spaced apart from each other in the front-rear direction 8. The carriage 40 is movable over a range from rightward of a right end of the media passing area to leftward of a left end of the media passing area in the left-right direction 9. It is noted that the direction along which the carriage 40 is movable is not limited to the left-right direction 9, but may be any direction that intersects the conveyance direction 15.

The guide rail 56 is disposed upstream of the head 38 in the conveyance direction 15. The guide rail 57 is disposed downstream of the head 38 in the conveyance direction 15. The guide rails 56 and 57 are supported by side frames (not shown) which are disposed outside the straight section 3 of the conveyance path 64 in the left-right direction 9. The carriage 40 is configured to move by a driving force from a carriage driving motor 103 (see FIG. 5).

The encoder 35 (see FIG. 5) is disposed at one of the guide rails 56 and 57. The encoder 35 includes an encoder strip and an optical sensor. The encoder strip extends in the left-right direction 9. The optical sensor is disposed at a place to face the encoder strip in the carriage 40. The encoder strip is marked with a pattern in which light transmissive areas and light blocking areas are arranged alternately at regular intervals along the left-right direction 9. The optical sensor is configured to detect the light transmissive areas and light blocking areas, thereby outputting pulse signals. The pulse signal is a signal corresponding to a position of the carriage 40 in the left-right direction 9. The pulse signal is output to the controller 130 (see FIG. 5).

The head 38 is supported by the carriage 40. A lower surface 68 of the head 38 is exposed downward and opposed to the platen 42. The head 38 includes a plurality of nozzles 39, an ink channel 37, and a piezoelectric element 45 (see FIG. 5).

The plurality of nozzles 39 have respective openings in the lower surface 68 of the head 38. The ink channel 37 connects the sub tank 210 with the plurality of nozzles 39. The piezoelectric element 45 (see FIG. 5) is configured to deform a portion of the ink channel 37, thereby ejecting ink droplets downward from the nozzles 39. The piezoelectric element 45 is further configured to operate when powered by the controller 130 (see FIG. 5). Thus, the head 38 has the nozzles 39 to eject ink.

Figure 3A:
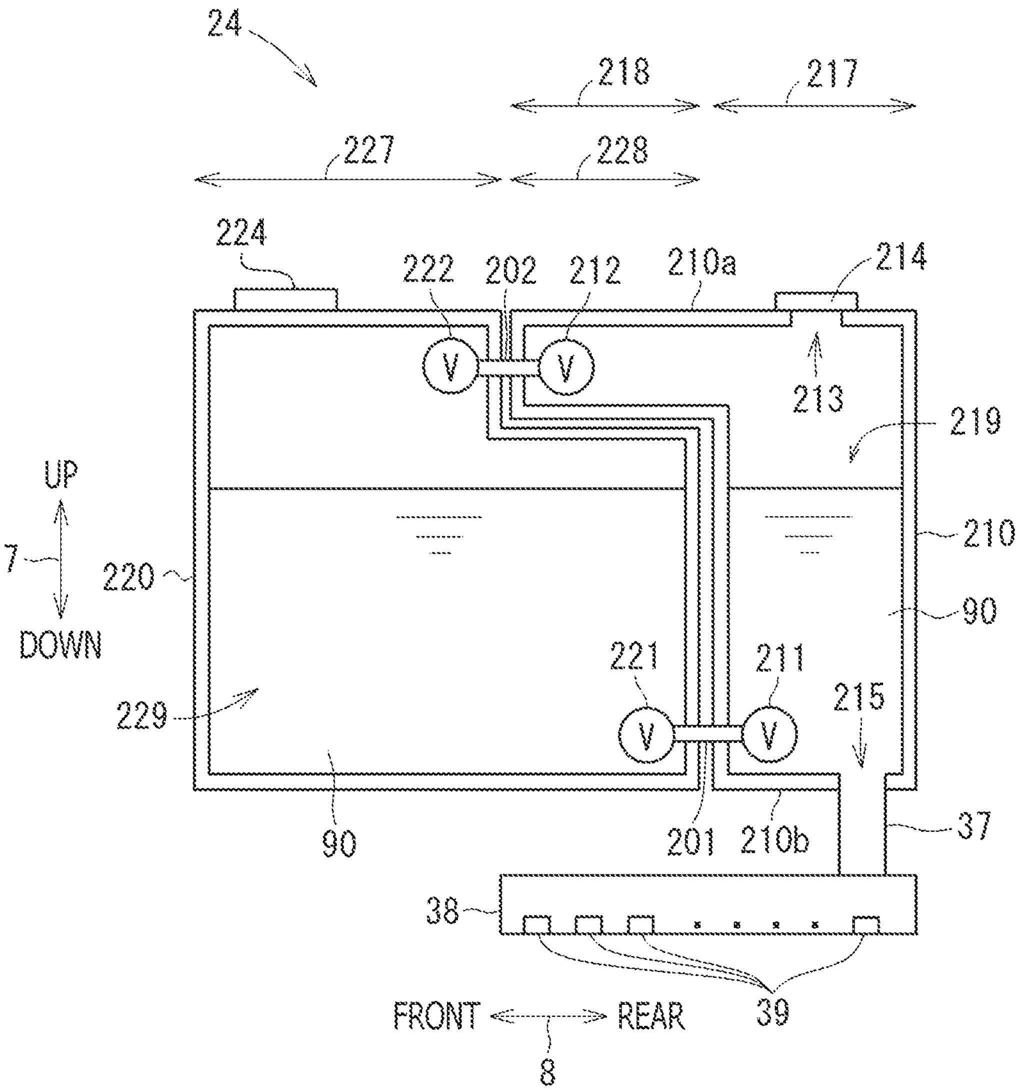
FIG. 3A is a cross-sectional side view, taken along a plane orthogonal to a left-right direction, of a recording device of the print engine that includes a cartridge with an identification chip.

As shown in FIG. 3A, the sub tank 210 has an internal space 219. The cartridge 220 has an internal space 229. The internal space 229 of the cartridge 220 is configured to store a particular amount of ink 90. The internal space 219 of the sub tank 210 is configured to store the ink 90 supplied from the cartridge 220.

In the illustrative embodiment, the recording device 24 has one sub tank 210. One cartridge 220 is attached to the one sub tank 210. Initially, the cartridge 220 stores therein a particular amount of black ink 90. The sub-tank 210 is configured to store the black ink 90 supplied from the cartridge 220. It is noted that the color of the ink 90 that is stored in the cartridge 220 and is to be later stored in the sub tank 210 is not limited to black. Further, the cartridge 220 may have an identification chip 224 (see FIG. 3A).

The sub tank 210 is located above the head 38. In the illustrative embodiment, the sub tank 210 is entirely located above the head 38. However, a part of the sub tank 210 may be located higher than the head 38, and the other part of the sub tank 210 may be located equal to or lower than the head 38. A lower wall 210*b* of the sub tank 210 is provided with an outflow port 215. The outflow port 215 is configured to let the ink 90 stored in the sub tank 210 flow out therethrough. The outflow port 215 is connected with an end of the ink channel 37. The internal space 219 of the sub tank 210 is communicated, via the ink channel 37, with the plurality of nozzles 39. Thereby, the ink 90 is enabled to be supplied to the nozzles 39 from the internal space 219 of the sub tank 210.

[Ink Supply System]

The cartridge 220 is attached horizontally to the sub tank 210. Hereinafter, a state in which the cartridge 220 is attached to the sub tank 210 may be referred to as an "attached state." Meanwhile, a state in which the cartridge 220 is not attached to the sub tank 210 may be referred to as a "separated state." FIG. 3A schematically shows a longitudinal section of the recording device 24 in the attached state.

As shown in FIG. 3A, the sub tank 210 and the cartridge 220 have substantially the same size in the vertical direction. The sub tank 210 has a first base section 217 and a first extending section 218. The first base section 217 has a bottom surface positioned relatively low. The first base section 217 is formed in a rectangular shape. The first extending section 218 has a bottom surface positioned higher than the bottom surface of the first base section 217. The first extending section 218 is formed in a rectangular shape. The first extending section 218 extends from an upper portion of the first base section 217.

The cartridge 220 has a second base section 227 and a second extending section 228. The second base section 227 has an upper surface positioned relatively high. The second base section 227 is formed in a rectangular shape. The second extending section 228 has an upper surface positioned lower than the upper surface of the second base section 227. The second extending section 228 is formed in a rectangular shape. The second extending section 228 extends from a lower portion of the second base section 227.

The first extending section 218 and the second extending section 228 has substantially the same size in the front-rear direction 8. The sum of the size of the first extending section 218 in the vertical direction 7 and the size of the second extending section 228 is substantially the same as the size of the sub tank 210 in the vertical direction 7 and as the size of the cartridge 220 in the vertical direction 7. In the attached state, the second extending section 228 fits a space below the first extending section 218. Thus, the cartridge 220 has a shape easily attachable to the sub tank 210.

In the example shown in FIG. 3A, the sub tank 210 is formed in such a shape that an upper portion thereof extends forward. Further, the cartridge 220 is formed in such a shape that a lower portion thereof extends backward. However, the shapes of the sub tank and the carriage are not limited to those shown in FIG. 3A which are merely examples. For instance, as shown in FIG. 13, a sub tank 310 may be formed in such a shape that a lower portion thereof extends forward. In this case, a cartridge 320 may be formed in such a shape that an upper portion thereof extends backward. In another instance, as shown in FIG. 14, a sub tank 410 and a cartridge 420 may have no extending sections.

The sub tank 210 has valves 211 and 212 inside. The cartridge 220 has valves 221 and 222 inside. The valve 211 is disposed in a lower front position in the internal space 219 of the sub tank 210. The valve 212 is disposed in an upper front position in the internal space 219 of the sub tank 210. The valve 221 is disposed in a lower rear position in the internal space 229 of the cartridge 220. The valve 222 is disposed in an upper rear position in the internal space 229 of the cartridge 220. The valves 211 and 221 are located at a liquid flow path 201 that is brought in a communicable state in the attached state where the cartridge 220 is attached to the sub tank 210. The valves 212 and 222 are located at a gas flow path 202 that is brought in the communicable state in the attached state. In the attached state, the valves 211 and 221 are opposed to each other across the liquid flow path 201. In the attached state, the valves 212 and 222 are opposed to each other across the gas flow path 202. The cartridge 220 does not have a back pressure control mechanism. In addition, the positions of the valves 211, 212, 221, and 222 are not limited to the aforementioned positions which are merely examples.

In the separated state where the cartridge 220 is not attached to the sub tank 210, the valves 211, 212, 221, and 222 are all in a closed state. In response to a transition from the separated state to the attached state, the valves 211, 212, 221, and 222 are all brought from the closed state into an open state. Thereby, the liquid flow path 201, for connecting the sub tank 210 and the cartridge 220 through the valves 211 and 221, and the gas flow path 202, for connecting the sub tank 210 and the cartridge 220 through the valves 212 and 222, are brought into the communicable state. Thus, the internal space 219 of the sub tank 210 and the internal space 229 of the cartridge 220 are communicated with each other via the liquid flow path 201 and the gas flow path 202. In response to a transition from the attached state to the separated state, the valves 211, 212, 221, and 222 are all brought from the open state into the closed state. Thereby, the liquid flow path 201 and the gas flow path 202 are brought into an incommunicable state, in which the internal space 219 of the sub tank 210 and the internal space 229 of the cartridge 220 are not communicated with each other.

An atmosphere communication hole 213 is formed at an upper wall 210*a* of the sub tank 210. The atmosphere communication hole 213 has a semipermeable membrane 214 affixed to cover and close the atmosphere communication hole 213. The semipermeable membrane 214 is a porous membrane having minute pores that block the passage of ink and allow the passage of gas. For instance, the semipermeable membrane 214 is made of fluorine resin such as polytetrafluoroethylene, polychlorotrifluoroethylene, tetrafluoroethylene-hexafluoropropylene copolymer, tetrafluoroethylene-perfluoroalkyl vinyl ether copolymer, and tetrafluoroethylene-ethylene copolymer. Thereby, the ink 90 stored in the internal space 219 of the sub tank 210 is blocked by the semipermeable membrane 214 and thereby kept from moving to the outside of the sub tank 210 through the atmosphere communication hole 213. On the other hand, air is allowed to move freely between the internal space 219 and the outside, of the sub tank 210.

Figure 3B:
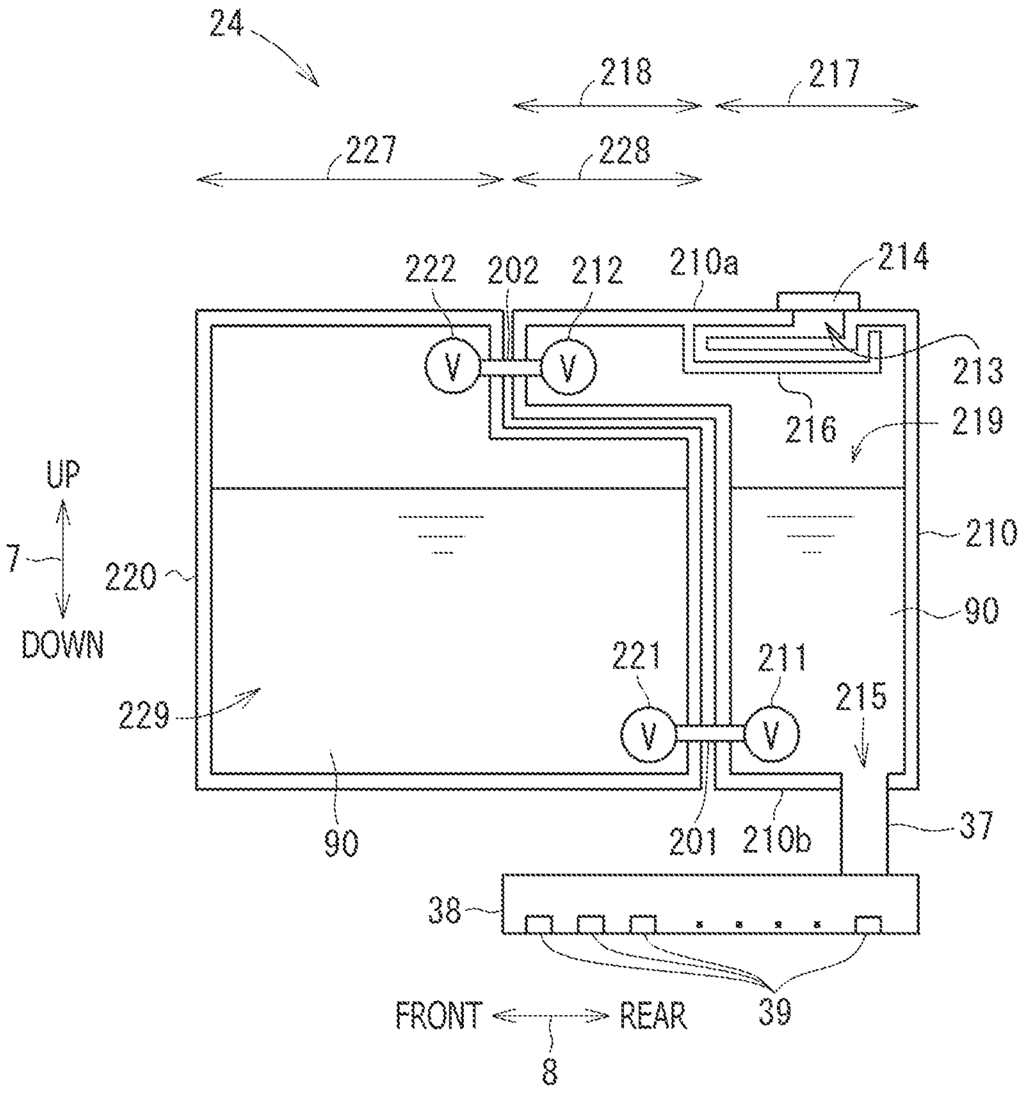
FIG. 3B is a cross-sectional side view, taken along a plane orthogonal to the left-right direction, of a recording device of the print engine that includes a sub tank with a labyrinth structure.

Air enters portions where the ink 90 does not exist, of the internal space 219 of the sub tank 210 and the internal space 229 of the cartridge 229. The portions in which air has been introduced may be referred to as "gas layers." The atmosphere communication hole 213 communicates therethrough the internal space 219 (more specifically, the gas layer) of the sub tank 210 with the atmosphere. As shown in FIG. 3B, a labyrinth structure 216 may be provided between the internal space 219 and the semipermeable membrane 214. When the labyrinth structure 216 is provided, it is possible to suppress evaporation of the ink 90 stored in the sub tank 210.

In an initial state, there is no ink 90 stored in the internal space 219 of the sub tank 210. A particular amount of ink 90 is stored in the internal space 229 of the cartridge 220. In response to the transition from the separated state to the attached state (i.e., in response to the cartridge 220 being attached to the sub tank 210), the liquid flow path 201, for connecting the sub tank 210 and the cartridge 220 through the valves 211 and 221, and the gas flow path 202, for connecting the sub tank 210 and the cartridge 220 through the valves 212 and 222, are brought into the communicable state. Therefore, air moves from the internal space 219 of the sub tank 210 to the internal space 229 of the cartridge 220 via the gas flow path 202. In addition, the ink 90 stored in the internal space 229 of the cartridge 220 moves into the internal space 219 of the sub tank 210 via the liquid flow path 201. The ink 90 is supplied from the cartridge 220 to the sub tank 210 until a liquid surface level of the ink 90 stored in the internal space 219 of the sub tank 210 becomes as high as a liquid surface level of the ink 90 stored in the internal space 229 of the cartridge 220. A state in which the movements of the ink 90 and the air between the sub tank 210 and the cartridge 220 are balanced (i.e., a state in which the movements are substantially stopped) may be referred to as an "equilibrium state."

At substantially the same time when image recording is performed, and the ink 90 stored in the sub tank 210 flows out through the outflow port 215, air moves into the internal space 219 of the sub tank 210 through the atmosphere communication hole 213 and the semipermeable membrane 214. A part of the air that has moved into the sub tank 210 moves into the internal space 229 of the cartridge 220 through the gas flow path 202. Therefore, the ink 90 contained in the internal space 229 of the cartridge 220 moves into the internal space 219 of the sub tank 210 via the liquid flow path 201. The ink 90 is supplied from the cartridge 220 to the sub tank 210 until the equilibrium state is reached. Once the equilibrium state is reached, the movements of the air and the ink 90 stop.

The semipermeable membrane 214 is positioned above the liquid surface level of the ink 90 stored in the sub tank 210 after the liquid surface level of the ink 90 stored in the sub tank 210 and the liquid surface level of the ink 90 stored in the cartridge 220 have been brought into the equilibrium state. The outflow port 215 is positioned below the liquid flow path 201.

When the cartridge 220 is attached to the sub tank 210, the gas flow path 202 may come into the communicable state at the same time as or earlier than the liquid flow path 201. According to this configuration, when the pressure in the cartridge 220 is high, it is possible to suppress the movement of the ink 90 stored in the cartridge 220 into the sub tank 210 and to restrict the ink 90 and air bubbles from moving to the vicinity of the atmosphere communication hole 213. In another instance, when the cartridge 220 is attached to the sub tank 210, the gas flow path 202 may come into the communicable state later than the liquid flow path 201. According to this configuration, it is possible to reduce the possibility that the ink 90 might leak from elements on the liquid flow path 201.

When the cartridge 220 is removed from the sub tank 210, the gas flow path 202 may come into the incommunicable state at the same time as or later than the liquid flow path 201. According to this configuration, it is possible to remove the cartridge 220 from the sub tank 210 after the pressure in the cartridge 220 has been brought to the atmospheric pressure. In another instance, when the cartridge 220 is removed from the sub tank 210, the gas flow path 202 may come into the incommunicable state earlier than the liquid flow path 201. According to this configuration, it is possible to reduce the possibility that the ink 90 might leak from elements on the liquid flow path 201.

When the cartridge 220 is attached to or removed from the sub tank 210, which of the liquid flow path 201 and the gas flow path 202 is first brought into the communicable state or the incommunicable state may be determined depending on, for instance, detailed configurations of the valves 211, 212, 221, and 222.

[Configurations of Valves]

The valves 211 and 212 have the same configuration. The valves 221 and 222 have the same configuration. Hereinafter, the respective configurations of the valves 211 and 221 will be described with reference to FIGS. 4A to 4C. The valve 211 has a needle 231, a spring 232, a fixed section 233, and a packing 234. The valve 211 is disposed inside a cylindrical housing 237 that is positioned below the sub tank 210. The needle 231 has a contact portion, a front portion, and a rear portion. The front portion protrudes forward from the contact portion. The rear portion protrudes backward from the contact portion. The housing 237 has a side surface, and an end face section 238 orthogonal to the side surface. The end face section 238 has a hole formed at a central portion of the end face section 238. The front portion of the needle 231 is put through the hole.

The front portion and the contact portion of the needle 231 are hollow. In a side surface, near a distal end, of the front portion of the needle 231, a hole 235 is formed that connects with the hollow portion of the needle 231. In a surface 240 that is the closest surface to the end face section 238 among surfaces of the contact portion of the needle 231, a hole 236 is formed that connects with the hollow portion of the needle 231.

The rear portion of the needle 231 is connected with one end of the spring 232. The other end of the spring 232 is connected with the fixed section 233. The position of the fixed section 233 is fixed relative to the housing 237. The packing 234 has a circular ring shape. The packing 234 is attached to an inner surface of the end face section 238 at a location opposed to the hole 236. The spring 232 is configured to urge the needle 231 toward the end face section 238. Therefore, in the separated state, the contact portion of the needle 231 is in contact with the packing 234, and the hole 236 is closed by the packing 234 (see FIG. 4A). Accordingly, the valve 211 is closed in the separated state where the cartridge 220 is not attached to the sub tank 210.

The valve 221 has a movable section 241, a spring 242, a fixed section 243, and a packing 244. The valve 221 is disposed inside a cylindrical housing 247 that is positioned below the cartridge 220. The spring 242 is stronger than the spring 232 (i.e., the spring 242 has a higher elastic modulus than the spring 232). The housing 247 has a side surface, and an end face section 248 orthogonal to the side surface. The end face section 248 has a hole 249 in which the front portion of the needle 231 is insertable. A receiving section 239 is provided at one end of the housing 237. The receiving section 239 is configured to receive the housing 247 fitted therein. Thereby, the housing 247 is fittable in the housing 237.

The movable section 241 has a disk-shaped contact portion and a rear portion that protrudes backward from the contact portion. The rear portion of the movable section 241 is connected with one end of the spring 242. The other end of the spring 242 is connected with the fixed section 243. The position of the fixed section 243 is fixed relative to the housing 247. The packing 244 has a circular ring shape. The packing 244 is attached around the hole 249, on an inner surface of the end face section 248.

The contact portion of the movable section 241 is sized to close the hole 249. The spring 242 is configured to urge the movable section 241 toward the end face section 248. Therefore, in the separated state, the contact portion of the movable section 241 is in contact with the packing 244, and the hole 249 is closed by the movable section 241 (see FIG. 4A). Therefore, the valve 221 is closed in the separated state where the cartridge 220 is not attached to the sub tank 210.

As shown in FIG. 4B, during the transition from the separated state to the attached state, the front portion of the needle 231 comes into contact with the movable section 241. As the sub tank 210 and cartridge 220 further approach each other, the front portion of the needle 231 pushes the movable section 241 forward. The spring 232 is weaker than the spring 242 (i.e., the spring 232 has a lower elastic modulus than the spring 242). Therefore, the spring 232 contracts before the spring 242 contracts (more exactly, the spring 232 contracts more than the spring 242 does). As the spring 232 contracts, the contact portion of the needle 231 is separated from the packing 234. Thus, the valve 211 is brought into the open state. However, the hole 235 formed in the side surface of the needle 231 is closed by the packing 244.

As shown in FIG. 4C, in the attached state, a pressing force of the front portion of the needle 231 pressing the movable section 241 becomes stronger. In this state, the spring 242 contracts sufficiently to separate the contact portion of the movable section 241 from the packing 244. The hole 235 formed in the side surface of the needle 231 is separated from the packing 244. Thus, the valve 221 is brought into the open state.

All the valves 211, 212, 221, and 222 are closed in the separated state, and are open in the attached state. In response to the transition from the separated state to the attached state, the valves 211, 212, 221, and 222 change from the closed state into the open state. In response to the transition from the attached state to the separated state, the valves 211, 212, 221, and 222 change from the open state into the closed state. It is noted that the valves 211, 212, 221, and 222 may have a configuration other than the configuration shown in FIGS. 4A to 4C as long as the states of the valves 211, 212, 221, and 222 change in the aforementioned manner.

[Rotary Encoder]

The rotary encoder 65 shown in FIG. 5 is disposed at a shaft of the conveyance motor 101 (see FIG. 5). The rotary encoder 65 includes an encoder disk and an optical sensor. The encoder disk is configured to rotate together with the conveyance motor 101. The encoder disk has a pattern in which transmissive areas and non-transmissive areas are arranged alternately at regular intervals along a circumferential direction. The transmissive areas are areas through which light is transmitted. The non-transmissive areas are areas through which light is not transmitted. When the encoder disk rotates, a pulse signal is generated each time a transmissive area and a non-transmissive area are detected by the optical sensor. The generated pulse signals are output to the controller 130 (see FIG. 5). The controller 130 calculates an amount of rotation of the conveyance motor 101 based on the pulse signals. It is noted that the rotary encoder 65 may be disposed at a rotatable element (e.g., the feed motor 102 or the conveying roller 60) other than the conveyance motor 101.

[Controller and Memory]

Hereinafter, configurations of the controller 130 and the memories 140 will be described with reference to FIG. 5. The controller 130 is configured to control overall operations of the MFP 10. The controller 130 includes a CPU 131 and an ASIC 135. The memories 140 include a ROM 132, a RAM 133, and an EEPROM 134. The CPU 131, the ASIC 135, the ROM 132, the RAM 133, and the EEPROM 134 are interconnected via an internal bus 137.

The ROM 132 stores programs configured to, when executed by the CPU 131, cause the CPU 131 to perform various operations. The RAM 133 is usable as a storage area to temporarily store data and signals used when the CPU 131 executes the programs, or as a work area for data processing. The EEPROM 134 is configured to store settings and flags to be held even after the MFP 10 is powered off.

The ASIC 135 is connected with the conveyance motor 101, the feed motor 102, and the carriage driving motor 103. The ASIC 135 incorporates drive circuits, each of which is for controlling a corresponding one of the motors 101, 102, and 103. The CPU 131 is configured to output drive signals for rotating each of the motors 101, 102, and 103 to the corresponding drive circuit. Each drive circuit is configured to output, to the corresponding motor, a drive current according to the drive signal obtained from the CPU 131. Thereby, the corresponding motor rotates. Namely, the controller 130 is configured to control the feed motor 102, thereby causing the sheet feeder 16 to feed the sheets 12. Further, the controller 130 is configured to control the conveyance motor 101, thereby causing the conveyance rollers 59 and the discharge rollers 44 to convey the sheets 12. Further, the controller 130 is configured to control the carriage driving motor 103 to move the carriage 40.

Further, the ASIC 135 is connected with the optical sensor of the rotary encoder 65. The controller 130 is configured to calculate the amount of rotation of the conveyance motor 101 based on electrical signals received from the optical sensor of the rotary encoder 65. In addition, the ASIC 135 is connected with the encoder 35. The controller 130 is configured to recognize the position and the movement of the carriage 40 based on the pulse signals received from the encoder 35.

The ASIC 135 is connected with the piezoelectric element 45. The piezoelectric element 45 is operated when supplied with electricity by the controller 130 via a drive circuit (not shown). The controller 130 is configured to control the power supply to the piezoelectric element 45, thereby causing the plurality of nozzles 39 to selectively eject ink droplets therefrom. Further, the ASIC 135 is connected with a status sensor (not shown). The controller 130 is configured to perform after-mentioned image recording process and abnormality process, based on signals received from the status sensor.

The controller 130 is configured to alternately perform a conveyance process and a printing process, to record an image on a sheet 12. The conveyance process is a process of causing the conveyance rollers 59 and the discharge rollers 44 to convey the sheet 12 by a particular line feed amount.

The controller 130 controls the conveyance motor 101, thereby causing the conveyance rollers 59 and the discharge rollers 44 to perform the conveyance process. The printing process is a process of controlling the power supply to the piezoelectric element 45 while moving the carriage 40 along the left-right direction 9, thereby causing the head 38 to eject ink droplets from the nozzles 39. During the printing process, the carriage 40 is located in the media passing area (i.e., the area between the left end and the right end of the platen 42), and is opposed to the platen 42 in the vertical direction 7.

The controller 130 stops the sheet 12 for a particular period of time between the last conveyance process and the next conveyance process. Then, the controller 130 performs the printing process during the particular period of time for which the sheet 12 is stopped. Namely, in the printing process, the controller 130 performs a single pass of image recording to cause the head 38 to eject ink droplets from the nozzles 39 while moving the carriage 40 leftward or rightward. Thus, the single pass of image recording is performed on the sheet 12.

The controller 130 is configured to perform image recording over an entire image-recordable area of the sheet 12 by alternately and repeatedly performing the conveyance process and the printing process. Namely, the controller 130 is enabled to perform image recording on a single sheet 12 through a plurality of passes. Thus, in the MFP 10, the carriage 40 is movable along the left-right direction 9 with the head 38, the sub tank 210, and the cartridge 220 attached to the sub tank 210 being mounted on the carriage 40. The head 38 is configured to eject ink droplets from the nozzles 39 when the carriage 40 is moving leftward or rightward along the left-right direction 9.

The controller 130 is not limited to the one configured as above. For instance, the controller 130 may be configured in such a manner that only the CPU 131 performs the various processes, or that the CPU 131 and the ASIC 135 perform the various processes in cooperation with each other. In another instance, the controller 130 may be configured in such a manner that a single CPU 131 performs the processing solely, or that a plurality of CPUs 131 share the processing. In yet another instance, the controller 130 may be configured in such a manner that a single ASIC 135 performs the processing solely, or that a plurality of ASICs 135 share the processing.

[Image Recording Control by Controller]

With the print engine 11 configured as described above, the controller 130 performs a series of image recording control processes, in which the controller 130 controls the print engine 11 to feed a sheet 12 with the sheet feeder 16 and perform image recording on the sheet 12 with the recording device 24. Hereinafter, the image recording control by the controller 130 will be described with reference to FIG. 6.

When the image recording control is not being performed, the carriage 40 is positioned outside of the media passing area in the left-right direction 9, and is not opposed to the platen 42 in the vertical direction 7. Hereinafter, the position of the carriage 40 in this case may be referred to as the "maintenance position."

A print command is sent to the controller 130 via the operation I/F 17 of the MFP 10 (see FIG. 1) or from an external device connected with the MFP 10. The print command contains a command to start the image recording control, information regarding the size of the sheet 12, and print data to be image-recorded on the sheet 12.

In response to obtaining the print command (S10: Yes), the controller 103 feeds a sheet 12 supported on the feed tray 20 (S20).

In S20, the controller 130 drives the feed motor 102. Thereby, the pick-up roller 25 feeds the sheet 12 supported on the feed tray 20 to the conveyance path 64. Further, the controller 130 drives the conveyance motor 101. Thereby, after a leading end of the sheet 12 fed to the conveyance path 64 by the pick-up roller 25 has reached the conveyance rollers 59, the conveyance rollers 59 convey the sheet 12 in the conveyance direction 15.

Next, the controller 130 drives the carriage driving motor 103 to move the carriage 40 from the maintenance position to a start position. The start position is a position from which the carriage 40 starts moving when the controller 130 starts performing a printing process (see S30). The start position is determined based on the print data. In S20, the feeding operation to feed the sheet 12 and the moving operation to move the carriage 40 are performed in parallel.

Next, controller 130 performs the printing process (S30). In the printing process of S30, the controller 130 performs a single pass of image recording. Specifically, the controller 130 causes the head 38 to eject ink droplets from the nozzles 39 while moving the carriage 40 from the start position. It is noted that the carriage 40, which has started moving from the start position in S20, may continue to move for the printing process without stopping at the start position. Of course, the carriage 40 may stop once at the start position.

Next, the controller 130 determines whether the image recording on the current sheet 12 has been completed, based on the information regarding the size of the sheet 12 and the print data that are contained in the print command (S40).

When determining in S40 that the image recording on the current sheet 12 has not been completed (S40: No), the controller 130 performs a conveyance process (S50). Specifically, in the conveyance process of S50, the controller 130 drives the conveyance motor 101 and causes the conveyance rollers 59 and the discharge rollers 44 to convey the sheet 12 by a particular line feed amount. Thereafter, the controller 130 proceeds to S30.

When determining in S40 that the image recording on the current sheet 12 has been completed (S40: Yes), the controller 130 causes the conveyance rollers 59 and the discharge rollers 44 to convey the sheet 12 in the conveyance direction 15 and discharge the sheet 12 onto the discharge tray 21 (S60).

Subsequently, the controller 130 determines whether the image data contained in the print command includes image data that has not yet been recorded on a sheet 12, that is, whether there is image data of a next page to be image-recorded (S70).

When there is image data of a next page to be image-recorded (S70: Yes), the controller 130 proceeds to S20. In this case, the controller 130 feeds a subsequent sheet 12 from the feed tray 20 to the conveyance path 64 (S20). It is noted that the feeding of the subsequent sheet 12 in S20 may be performed in parallel with the discharge of the preceding sheet 12 in S60. When there is not image data of a next page to be image-recorded (S70: No), the controller 130 terminates the series of image recording control processes.

Hereinabove, an example case has been described in which the controller 130 normally performs image recording control. However, the controller 130 may perform a process (not shown) to detect abnormalities while performing image recording control, and a process (not shown) to be executed when one or more abnormalities have been detected.

[Advantageous Effects of Illustrative Embodiment]

In the MFP 10 of the illustrative embodiment, when the cartridge 220 is attached to the sub tank 210, the ink 90 in the cartridge 220 is transferred to and stored in the sub tank 210. Then, the ink 90 stored in the sub tank 210 is supplied to the head 38. Hence, it is possible to restrict air bubbles of the ink 90 from entering the head 38 and to eject the ink 90 stored in the cartridge 220 until a remaining amount of the ink 90 in the cartridge 220 becomes small. In addition, there is no need to provide a back pressure control mechanism to the cartridge 220. Therefore, it is possible to downsize the ink supply system including the cartridge 220 while increasing the volume ratio of the ink 90 storable in the cartridge 220.

Further, in response to the transition from the separated state to the attached state, the valves 211 and 212 in the sub tank 210 change from the closed state into the open state. In response to the transition from the attached state to the separated state, the valves 211 and 212 in the sub tank 210 change from the open state to the closed state. In the separated state where the cartridge 220 is not attached to the sub tank 210, the valve 211 is closed to prevent ink leakage from the sub tank 210. Moreover, in the separated state, the internal space 229 of the cartridge 220 is not communicated with the atmosphere. Therefore, it is possible to prevent ink leakage from the cartridge 220 alone. Further, there is no need to provide a labyrinth structure or a semipermeable membrane to the cartridge 220. Hence, it is possible to simplify the structure of the cartridge 220.

Further, the semipermeable membrane 214 is positioned above the liquid surface level of the ink 9 stored in the sub tank 210 in the equilibrium state. Therefore, it is possible to prevent malfunctions of the semipermeable membrane 214. In addition, the sub tank 210 has the first base section 217 and the first extending section 218 that extends from the upper portion of the first base section 217. The cartridge 220 has the second base section 227 and the second extending section 228 that extends from the lower portion of the second base section 227. Therefore, it is possible to reduce a volume of the gas layer in the cartridge 220 and increase an amount of liquid storable in the cartridge 220. Moreover, the outflow port 215 is positioned below the liquid flow path 201. Therefore, it is possible to reduce an amount of ink 90 left in the cartridge 220.

While aspects of the present disclosure have been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment(s) according to aspects of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

[First Modifications]

Various modifications may be applied to the MFP 10 according to aspects of the present disclosure. An MFP in each first modification according to aspects of the present disclosure may include a valve that is disposed at the atmosphere communication hole 213 of the sub tank 210 and is configured to be closed in the separated state where the cartridge 220 is not attached to the sub tank 210. Examples of the valve configured to be closed in the separated state will be described below with reference to FIGS. 7A to 10B.

In an example shown in FIG. 7A, the atmosphere communication hole 213 is formed at a right wall 210*c* of the sub tank 210. A valve 251 has a movable section 252, a spring 253, and a packing 254. The valve 251 is disposed at a location where the valve 251 is enabled to shield the atmosphere communication hole 213, outside the right wall 210*c* of the sub tank 210. The movable section 252 has a flat plate shape. One side of the movable section 252 is connected with one end of the spring 253. The other end of the spring 253 is connected with an outer surface of the right wall 210*c* of the sub tank 210. The packing 254 has a circular ring shape. The packing 254 is attached around the atmosphere communication hole 213, on the outer surface of the right wall 210*c* of the sub tank 210.

In response to receiving a command to replace the cartridge 220, the controller 130 moves the carriage 40 to a cartridge replacement position. The cartridge replacement position is, for instance, a rightmost position in the left-right direction 9 within a range over which the carriage 40 is movable. When the carriage 40 is in a position other than the cartridge replacement position, the movable section 252 is positioned away from the packing 254. Therefore, in this case, the valve 251 is open.

A frame 255 disposed near the cartridge replacement position has a protrusion 256 that protrudes in the left-right direction 9. The protrusion 256 is positioned contactable with the movable section 252 in the vertical direction 7 and the front-rear direction 8. When the carriage 40 is in the cartridge replacement position, the protrusion 256 is in contact with the movable section 252. At this time, the spring 253 contracts until the movable section 252 comes into contact with the packing 254, and the valve 251 is closed.

Replacement of the cartridge 220 is always performed in a state where the carriage 40 is in the cartridge replacement position. The valve 251 is closed when the carriage 40 is in the cartridge replacement position. Therefore, the valve 251 is closed in the separated state where the cartridge 220 is not attached to the sub tank 210.

In an example shown in FIG. 7B, the atmosphere communication hole 213 is formed at the right wall 210*c* of the sub tank 210. A valve 261 is a solenoid valve having a movable section 262, a solenoid 263, and a packing 264. The valve 261 is disposed at a location where the valve 261 is enabled to shield the atmosphere communication hole 213, outside the right wall 210*c* of the sub tank 210. The movable section 262 has a contact portion formed in a flat plate shape, and a shaft that protrudes rightward from the contact portion. The shaft of the movable section 262 is connected with the solenoid 263. The solenoid 263 is supported by a supporter 265 disposed at the right wall 210*c* of the sub tank 210.

The solenoid 263 is supplied with electric current by means not shown. The controller 130 controls whether to apply electric current to the solenoid 263. When no electric current is applied to the solenoid 263, the movable section 262 is in a position (indicated by a dashed line) away from the packing 264 by the action of the solenoid 263. At this time, the valve 261 is open. When an electric current is applied to the solenoid 263, the movable section 262 is positioned in contact with the packing 264 by the action of the solenoid 263. At this time, the valve 261 is closed.

In response to receiving a command to replace the cartridge 220, the controller 130 moves the carriage 40 to the cartridge replacement position and takes control to apply electric current to the solenoid 263. At this time, the valve 261 is closed. Thus, the valve 261 is closed in the separated state where the cartridge 220 is not attached to the sub tank 210.

In an example shown in FIGS. 8 and 9, the atmosphere communication hole 213 is formed at the upper wall 210*a* of the sub tank 210. The valve 271 has a movable section 272 and a fixed section 273. Between the movable section 272 and the fixed section 273, an atmosphere communication path 274 is disposed that is connected with the atmosphere communication hole 213. The atmosphere communication path 274 is a tube formed of a flexible material.

A cover 275 is configured to cover a front surface and an upper surface of the cartridge 220. The cover 275 is rotatable around a shaft 276, between a first position shown in FIG. 8 and a second position shown in FIG. 9. The first position is a position where the cover 275 covers the cartridge 220. The second position is a position where the cover 275 is away from the cartridge 220. Replacement of the cartridge 220 is performed when the cover 275 is in the second position.

The movable section 272 is rotatable together with the cover 275 around the shaft 276. When the cover 275 is in the first position, the movable section 272 is not in contact with the atmosphere communication path 274. Therefore, the atmosphere communication path 274 is in a communicable state. In this state, a communication section, including the atmosphere communication hole 213 and the atmosphere communication path 274, is open. When the cover 275 is in the second position, the movable section 272 is in contact with the atmosphere communication path 274. In this case, the movable section 272 is closer to the fixed section 273 than when the cover 275 is in the first position. Therefore, the atmosphere communication path 274 is deformed by being pinched between the movable section 272 and the fixed section 273 and comes into an incommunicable state. In this state, the communication section is closed.

In response to receiving a command to replace the cartridge 220, the controller 130 moves the carriage 40 to the cartridge replacement position. When the carriage 40 is in the cartridge replacement position, the cover 275 is movable between the first position and the second position. As the cover 275 moves from the first position to the second position, the valve 271 is brought from the open state into the closed state. As the cover 275 moves from the second position to the first position, the valve 271 is brought from the closed state into the open state.

Replacement of the cartridge 220 is performed when the carriage 40 is in the cartridge replacement position, and the cover 275 is in the second position. When the cover 275 is in the second position, the valve 271 is closed. Therefore, the valve 271 is closed in the separated state where the cartridge 220 is not attached to the sub tank 210. A labyrinth structure or a semipermeable membrane may be provided near an atmosphere communication opening of the atmosphere communication path 274.

In an example shown in FIGS. 10A and 10B, the atmospheric communication hole 213 is formed at a front wall 210*d* of the sub tank 210. A valve 281 has a movable section 282, a spring 283, a fixed section 284, and a packing 285. The movable section 282 has a contact portion, and a front portion that protrudes forward from the contact portion. The front portion of the movable section 282 is inserted into the atmosphere communication hole 213. The contact portion of the movable section 282 is connected with one end of the spring 283. The other end of the spring 283 is fixed to the fixed section 284. The packing 285 is attached around the atmosphere communication hole 213, on an inner surface of the front wall 210*d* of the sub tank 210.

The spring 283 is configured to urge the movable section 282 toward the front wall 210*d*. Therefore, in the separated state where the cartridge 220 is not attached to the sub tank 210, the contact portion of the movable section 282 is in contact with the packing 285, and the atmosphere communication hole 213 is closed by the movable section 282 (see FIG. 10A). Accordingly, the valve 281 is closed in the separated state. Further, in the separated state, a part of the front portion of the movable section 282 protrudes from the front wall 210*d* of the sub tank 210.

In the attached state where the cartridge 220 is attached to the sub tank 210, the front portion of the movable section 282 is in contact with the housing of the cartridge 220. Therefore, the movable section 282 moves backward against a restoring force of the spring 283. Thereby, the contact portion of the movable section 282 is separated from the packing 285. At this time, a space is formed between the movable section 282 and the packing 285. Through the atmosphere communication hole 213 and this space, air flows into the internal space 219 of the sub tank 210. Accordingly, the valve 281 is open in the attached state.

Thus, in response to the transition from the attached state to the separated state, the valve 281 changes from the open state into the closed state. In response to the transition from the separated state to the attached state, the valve 281 changes from the closed state into the open state. A labyrinth structure or a semipermeable membrane may be provided between the internal space 219 of the sub tank 210 and the atmosphere communication hole 213.

Each of the above four types of valves 251, 261, 271, and 281 is closed in the separated state. Among them, the valve 271 changes its state according to whether the cover 275 is open or closed. The valve 281 changes its state according to whether the cartridge 220 is attached to or removed from the sub tank 210. The controller 130 does not control the states of the valves 271 and 281.

On the other hand, since the valve 261 is a solenoid valve, the controller 130 is allowed to control the state of the valve 261 at any timing by controlling the electric current flowing through the solenoid 263. In response to receiving a cartridge replacement command, the controller 130 changes the state of the valve 261 from the open state to the closed state. If the valve 261 is in the closed state when the controller 130 has received the cartridge replacement command, the controller 130 will maintain the valve 261 to be closed. At other times, the controller 130 may control the valve 261 to be open or to be closed.

For instance, the controller 130 may control valve 261 to be open during the image recording. In this case, in response to receiving the cartridge replacement command, the controller 130 moves the carriage 40 to the cartridge replacement position, and controls the valve 261 from the open state to the closed state. In another instance, the controller 130 may control the valve 261 to be closed in principle during the image recording, and may control the valve 261 to be open in response to determining that there is a need to open the valve 261 to supply the ink 90. In this case, the cartridge replacement position may be different from a position where the valve 261 is controlled to be open. In yet another instance, the controller 130 may control the valve 261 to be open in a standby state in which the MFP 10 is not performing image recording. In this case, the cartridge replacement position may be different from a standby position where the MFP 10 is in the standby state.

The valve 251 changes its state depending on whether the carriage 40 is in the cartridge replacement position, under control by the controller 130. Therefore, the controller 130 is allowed to control the state of the valve 251 at an arbitrary timing by moving the carriage 40 to the cartridge replacement position.

In the MFP according to each first modification, the valve is disposed at the atmosphere communication hole 213, and is closed in the separated state where the cartridge 220 is not attached to the sub tank 210. Therefore, in the separated state, the internal space 229 of the cartridge 220 is not communicated with the atmosphere, and therefore, it is possible to prevent ink leakage from the cartridge 220. In addition, by controlling the valve to be closed during the image recording, it is possible to generate a negative pressure in the sub tank 210 and the cartridge 220.

[Other Modifications]

An MFP in each second modification according to aspects of the present disclosure includes a detector configured to detect a liquid surface of the ink 90 stored in the sub tank 210. A part of the detector may be positioned in the sub tank 210. As shown in FIG. 11, the detector 291 includes a prism 292, a light emitting element 293, and a light receiving element 294. The prism 292 is disposed on a lower portion of an inner surface of a rear wall 210*e* of the sub tank 210. The light emitting element 293 and the light receiving element 294 are disposed on an outer surface of the rear wall 210*e* of the sub tank 210. Positions of the prism 292 in the vertical direction 7 and the left-right direction 9 correspond to positions of the light emitting element 293 and the light receiving element 294 in the vertical direction 7 and the left-right direction 9. The rear wall 210*e* of the sub-tank 210 is transparent or translucent in positions corresponding to the light emitting element 293 and the light receiving element 294.

When the liquid surface level of the ink 90 stored in the sub tank 210 is lower than a position of the detector 291 in the vertical direction, light emitted by the light emitting element 293 is reflected by the prism 292 and incident onto the light receiving element 294. At this time, the detector 291 outputs, for instance, a high-level signal to the controller 130. When the liquid surface level of the ink 90 stored in the sub tank 210 is higher than the position of the detector 291 in the vertical direction, the light emitted by the light emitting element 293 is scattered by the ink 90. Therefore, in this case, a level of light detectable by the light receiving element 294 becomes low. At this time, the detector 291 outputs, for instance, a low-level signal to the controller 130.

Accordingly, the controller 130 is enabled to detect the liquid surface level of the ink 90 stored in the sub tank 210, based on the output signal from the detector 291. Moreover, since a part of the detector 291 is disposed in the sub tank 210, the cartridge 220 needs not have a function to detect the liquid surface level of the ink 90. Therefore, it is possible to downsize the cartridge 220.

The MFP may include a detector other than the aforementioned detector 291. In an example shown in FIG. 12A, an actuator 301 is disposed in the internal space 219 of the sub tank 210. The actuator 301 has a head and a float. The actuator 301 is configured to rotate around a shaft 302. The rear wall 210*e* of the sub tank 210 has a protrusion 210*f* In a position P1 shown in FIG. 12A, a transmission-type sensor (not shown) is disposed to pinch a left wall (not shown) and a right wall (not shown) of the protrusion 210*f* The protrusion 210*f* is transparent or translucent.

When the liquid surface level of the ink 90 stored in the sub tank 210 is higher than a particular position, the actuator 301 becomes upright. At this time, the transmission-type sensor receives emitted light and outputs, for instance, a high-level signal to the controller 130. When the liquid surface level of the ink 90 stored in the sub tank 210 is lower than the particular position, the actuator 301 rotates around the shaft 302, and the head of the actuator 301 enter the protrusion 210*f*. At this time, the emitted light from the transmission-type sensor is blocked by the head of the actuator 301, and the transmission-type sensor outputs, for instance, a low-level signal. Thus, using the actuator 301 and the transmission-type sensor, it is possible to detect the liquid surface level of the ink 90 stored in the sub tank 210.

In an example shown in FIG. 12B, the rear wall 210*e* of the sub tank 210 has a protrusion 210*f* In a position P2 shown in FIG. 12B, a transmission-type sensor (not shown) is disposed to pinch a left wall (not shown) and a right wall (not shown) of the protrusion 210*f*.

When the liquid surface level of the ink 90 stored in the sub tank 210 is lower than a particular position, the transmission-type sensor receives emitted light and outputs, for instance, a high-level signal to the controller 130. When the liquid surface level of the ink 90 stored in the sub tank 210 is higher than the particular position, the emitted light from the transmission-type sensor is scattered by the ink 90. Therefore, in this case, a level of light detectable by the transmission-type sensor becomes low. At this time, the transmission-type sensor outputs, for instance, a low-level signal. Thus, using the transmission-type sensor, it is possible to detect the liquid surface level of the ink 90 stored in the sub tank 210.

An MFP in each third modification according to aspects of the present disclosure has a sub tank and a cartridge having different shapes from those of the MFP 10 in the aforementioned illustrative embodiment. As shown in FIG. 13, an MFP of a third modification includes a sub tank 310 having a first base section 317 and a first extending section 318. The first base section 317 has an upper surface positioned relatively high. The first extending section 318 has an upper surface positioned lower than the upper surface of the first base section 317. The first extending section 318 extends from a lower portion of the first base section 317. A cartridge 320 has a second base section 327 and a second extending section 328. The second base section 327 has a bottom surface positioned relatively low. The second extending section 328 has a bottom surface positioned higher than the bottom surface of the second base section 327. The second extending section 328 extends from an upper portion of the second base section 327. According to this configuration, it is possible to extend an ink-ejectable period of time after an amount of ink 90 stored in the cartridge 320 becomes small.

The sub tank may not have a first extending section. The cartridge may not have a second extending section. In an example shown in FIGS. 14A and 14B, a sub tank 410 does not have a first extending section, but has only a first base section. A cartridge 420 does not have a second extending section, but has only a second base section.

In an MFP of each fourth modification according to aspects of the present disclosure, a cartridge may be attached to a sub tank vertically or obliquely. In an example shown in FIG. 15, a cartridge 340 is attached to a sub tank 330 in the vertical direction 7. The valve 211 is disposed in an upper front position in an internal space 339 of the sub tank 330. The valve 212 is disposed in an upper rear position in the internal space 339 of the sub tank 330. The valve 221 is disposed in a lower front position in an internal space 349 of the cartridge 340. The valve 222 is disposed in a lower rear position in the internal space 349 of the cartridge 330. The valve 211 and the valve 221 are located at a liquid flow path 201 that is brought in a communicable state in an attached state where the cartridge 340 is attached to the sub tank 330. The valves 212 and 222 are located at a gas flow path 202 that is brought in a communicable state in the attached state. In the attached state, the valves 211 and 221 are opposed to each other across the liquid flow path 201, and the valves 212 and 222 are opposed to each other across the gas flow path 202.

A cartridge may be obliquely attached to a sub tank. In an example shown in FIGS. 16A and 16B, facing surfaces of a sub tank 430 and a cartridge 440 opposed to each other are slanted. The cartridge 440 is obliquely attached to the sub tank 430.

In an MFP in a fifth modification according to aspects of the present disclosure, an atmosphere communication hole is disposed not at a sub tank but at a cartridge. As shown in FIG. 17, a sub tank 350 has valves 211 and 212 inside. A cartridge 360 has valves 221 and 222 inside. The sub tank 350 does not have an atmosphere communication hole. The cartridge 360 has an atmosphere communication hole 363 formed at an upper wall 360*a* thereof. The atmosphere communication hole 363 has a semipermeable membrane 364 affixed to cover and close the atmosphere communication hole 363.

As shown in FIGS. 18A to 18C, the valves 211 and 221 change from a closed state into an open state in response to the transition from the separated state to the attached state. In the fifth modification, a spring 242 is weaker than a spring 232 (i.e., the spring 242 has a lower elastic modulus than the spring 232). Therefore, in a state shown in FIG. 18B, the spring 242 contracts before the spring 232 contracts (more exactly, the spring 242 contracts more than the spring 232 does). As the spring 242 contracts, a contact portion of a movable section 241 is separated from a packing 244. Thus, the valve 221 is brought into the open state. Thereafter, in a state shown in FIG. 18C, the valve 211 is brought into the open state.

In response to the transition from the separated state to the attached state, the valves 211, 212, 221, and 222 change from the closed state into the open state. In this case, the internal space 359 of the sub tank 350 and the internal space 369 of the cartridge 360 are communicated with each other via the liquid flow path 201 through the valves 211 and 221 and via the gas flow path 202 through the valves 212 and 222. The cartridge 360 has the atmosphere communication hole 363. Therefore, the internal space 359 of the sub tank 350 is communicated with the atmosphere through the gas flow path 202 and the atmosphere communication hole 363. Accordingly, the ink 90 stored in the cartridge 360 is transferred into the internal space 359 of the sub tank 350 through the liquid flow path 201.

An MFP in a sixth modification according to aspects of the present disclosure is configured to supply ink in a so-called chicken feed system. As shown in FIG. 19, a cartridge 380 is vertically attached to a sub tank 370. A first flow path 371 is disposed below a valve 211. A second flow path 372 is disposed below a valve 221. A lower end of the first flow path 371 is higher than a lower end of the second flow path 372. In this case, a flow path connected with the first flow path 371 through the valve 211 serves as a liquid flow path 201. A flow path connected with the second flow path 372 through the valve 212 serves as a gas flow path 202.

When image recording is performed, and the ink 90 stored in the sub tank 370 flows out from the outflow port 215, the liquid surface level of the ink 90 stored in the sub tank 370 becomes lower. When the liquid surface level becomes lower than the position of the lower end of the second flow path 372, air moves into the second flow path 372. The moved air moves, through the gas flow path 202, to the internal space 389 of the cartridge 380. Therefore, the ink 90 stored in the internal space 389 of the cartridge 380 moves into the internal space 379 of the sub tank 370 through the liquid flow path 201. Thereby, the ink 90 is supplied from the cartridge 380 to the sub tank 370.

When the ink 90 is supplied from the cartridge 380 to the sub tank 370, the liquid surface level of the ink 90 stored in the sub tank 370 becomes higher. When the liquid surface level becomes higher than the lower end of the first flow path 371, the movement of the ink 90 through the liquid flow path 201 stops. Thus, an appropriate amount of ink 90 is supplied from the cartridge 380 to the sub tank 370.

In an MFP of a seventh modification according to aspects of the present disclosure, as shown in FIG. 20, a head 38 is mounted on a carriage (not shown), but a sub tank 210 and a cartridge 220 are not mounted on the carriage. The head 38 and the sub tank 210 are connected with each other using a flexible tube 47. The sub tank 210 is communicated with the head 38 through the tube 47.

The sub tank 210 and the cartridge 220 are disposed in respective particular positions not on the carriage. As shown in FIG. 20, the sub tank 210 and the cartridge 220 may be disposed lower than the head 38.

An MFP of an eighth modification according to aspects of the present disclosure includes a plurality of sub tanks. For instance, as shown in FIG. 21, a recording device 24 may have four sub tanks 210M, 210C, 210Y, and 210B. The sub tanks 210M, 210C, 210Y, and 210B are arranged along the left-right direction 9. An atmosphere communication hole 213 and a semipermeable membrane 214 are disposed at each of the sub tanks 210M, 210C, 210Y, and 210B.

The sub tank 210M is configured to have a cartridge 220M removably attached in which magenta ink (not shown) is stored. The sub tank 210C is configured to have a cartridge 220C removably attached in which cyan ink (not shown) is stored. The sub tank 210Y is configured to have a cartridge 220Y removably attached in which yellow ink (not shown) is stored. The sub tank 210B is configured to have a cartridge 220B removably attached thereto in which black ink (not shown) is stored.

It is noted that the arrangement order in which the sub tanks 210M, 210C, 210Y, and 210B are arranged is not limited to the order shown in FIG. 21. The respective sizes of the sub tanks 210M, 210C, 210Y, and 210B may be the same as or different from each other.

Hereinabove, as examples of the liquid reservoir, the ink cartridges have been described that are removable by the user when the stored ink runs out. However, the liquid reservoir may be a tank that is unremovable by the user when the stored ink runs out. A liquid ejecting device with a tank may be configured to continuously perform printing with ink refilled by the user from an inlet provided at the tank. The liquid ejecting device having such a tank may have a sub tank between the tank and a head. In this case, the tank may be configured to be removably attached to the sub tank. Thereby, a manufacturer may provide a product lineup of a plurality of types of liquid ejecting devices by replacing different types of tanks having different shapes and/or volumes. Moreover, by modularizing components included in each liquid ejecting device and increasing the number of removably-attachable parts, it is possible to more easily provide liquid ejecting devices that are usable for a long period of time by replacing damaged parts with new ones.

Further, by making each type of tank removable from the sub tank, it is possible to provide liquid ejecting devices that are usable for a long period of time by replacing damaged tanks with new ones. It is noted that an MFP without a liquid reservoir (a cartridge or a tank) attached may be an example of the liquid ejecting device according to aspects of the present disclosure. An MFP with a liquid reservoir attached may be an example of the liquid ejecting device according to aspects of the present disclosure.

The following shows examples of associations between elements exemplified in the aforementioned illustrative embodiment and modifications, and elements according to aspects of the present disclosure. For instance, the MFP 10 may be an example of a "liquid ejecting device" according to aspects of the present disclosure. The head 38 may be an example of a "head" according to aspects of the present disclosure. The sub tank 210 may be an example of a "container" according to aspects of the present disclosure. The atmosphere communication holes 213 and 363 may be included in examples of a "communication section" according to aspects of the present disclosure. The atmosphere communication path 274 may be included in the "communication section" according to aspects of the present disclosure. The cartridge 220 may be an example of a "liquid reservoir" according to aspects of the present disclosure. The ink 90 may be an example of "liquid" according to aspects of the present disclosure. The valve 211 may be an example of a "first valve" according to aspects of the present disclosure. The valve 212 may be an example of a "second valve" according to aspects of the present disclosure. The valve 221 may be an example of a "third valve" according to aspects of the present disclosure, or may be an example of a "first reservoir valve" according to aspects of the present disclosure. The valve 222 may be an example of a "fourth valve" according to aspects of the present disclosure, or may be an example of a "second reservoir valve" according to aspects of the present disclosure. The valves 251, 261, 271, and 281 may be included in examples of a "communication valve" according to aspects of the present disclosure. The detector 291 may be an example of a "detector" according to aspects of the present disclosure. The prism 292 may be an example of a "part of the detector" according to aspects of the present disclosure. The carriage 40 may be an example of a "carriage" according to aspects of the present disclosure. The controller 130 may be an example of a "controller" according to aspects of the present disclosure. The cover 275 may be an example of a "cover" according to aspects of the present disclosure. The semipermeable membrane 214 may be an example of a "semipermeable membrane" according to aspects of the present disclosure. The outflow port 215 may be an example of an "outflow port" according to aspects of the present disclosure.

What is claimed is:

1. A liquid ejecting device comprising:

a head having a nozzle configured to eject liquid;

a container connected with the head, the container being configured to store the liquid;

a communication section configured to communicate an internal space of the container with atmosphere; and a liquid reservoir located outside the head and configured to store the liquid and to be removably attached to the container, wherein an internal space of the liquid reservoir is communicated with the internal space of the container through a liquid flow path and a gas flow path in an attached state where the liquid reservoir is attached to the container, and wherein in the attached state, when a first liquid-filled region in the internal space of the container is in communication with a second liquid-filled region in the internal space of the liquid reservoir via the liquid flow path, a second gas-filled region in the internal space of the liquid reservoir is in communication with a first gas-filled region in the internal space of the container via the gas flow path and in communication with the atmosphere via the communication section of the container, without any liquid-filled regions interposed between the second gas-filled region and the atmosphere, and wherein the first gas-filled region directly contacts the first liquid-filled region and the second gas-filled region directly contacts the second liquid-filled region.

2. The liquid ejecting device according to claim 1, wherein the container comprises:

the communication section;

a first valve disposed at the liquid flow path; and a second valve disposed at the gas flow path, and wherein the first valve and the second valve are configured to:

change from a closed state into an open state in response to a transition from a separated state where the liquid reservoir is not attached to the container to the attached state; and change from the open state into the closed state in response to a transition from the attached state to the separated state.

3. The liquid ejecting device according to claim 2, wherein the liquid reservoir comprises:

a third valve disposed at the liquid flow path; and a fourth valve disposed at the gas flow path, and wherein the third valve and the fourth valve are configured to:

change from a closed state into an open state in response to the transition from the separated state to the attached state; and change from the open state into the closed state in response to the transition from the attached state to the separated state.

4. The liquid ejecting device according to claim 1, wherein in the attached state, the container and the liquid reservoir are brought from a state where gas moves through the gas flow path from the internal space of the container to the internal space of the liquid reservoir, and the liquid moves through the liquid flow path from the internal space of the liquid reservoir to the internal space of the container, into an equilibrium state where the movements of the gas and the liquid are stopped.

5. The liquid ejecting device according to claim 1, wherein the communication section comprises a communication valve configured to switch between an open state and a closed state, the communication valve being further configured to be closed in a separated state where the liquid reservoir is not attached to the container.

6. The liquid ejecting device according to claim 5, further comprising:

a carriage configured to move along a particular direction with the head mounted thereon; and a controller configured to move the carriage to a liquid reservoir replacement position in response to receiving a command to replace the liquid reservoir, wherein the communication valve is further configured to change from the open state to the closed state in response to the carriage moving to the liquid reservoir replacement position, and wherein the communication valve is further configured to change from the closed state to the open state in response to the carriage moving away from the liquid reservoir replacement position.

7. The liquid ejecting device according to claim 5, further comprising a controller configured to switch the communication valve from the open state to the closed state in response to receiving a command to replace the liquid reservoir.

8. The liquid ejecting device according to claim 5, further comprising a cover movable between a first position where the cover covers the liquid reservoir and a second position where the cover is away from the liquid reservoir, wherein the communication valve is further configured to:

change from the open state to the closed state in response to the cover moving from the first position to the second position where the cover is away from the liquid reservoir; and change from the closed state to the open state in response to the cover moving from the second position to the first position.

9. The liquid ejecting device according to claim 5, wherein the communication valve is further configured to:

change from the open state into the closed state in response to a transition from the attached state to the separated state where the liquid reservoir is not attached to the container; and change from the closed state into the open state in response to a transition from the separated state to the attached state.

10. The liquid ejecting device according to claim 1, wherein the communication section comprises a semipermeable membrane that is positioned above a surface level of the liquid stored in the container after the surface level of the liquid stored in the container and a surface level of the liquid stored in the liquid reservoir are brought into an equilibrium state.

11. The liquid ejecting device according to claim 1, wherein the communication section is further configured to:

change from a closed state into an open state in response to a transition from a separated state where the liquid reservoir is not attached to the container to the attached state, and change from the open state into the closed state in response to a transition from the attached state to the separated state.

12. The liquid ejecting device according to claim 1, wherein the liquid reservoir is further configured to be horizontally attached to the container.

13. The liquid ejecting device according to claim 1, wherein the liquid reservoir is further configured to be vertically attached to the container.

14. The liquid ejecting device according to claim 1, wherein the liquid reservoir is further configured to be obliquely attached to the container.

15. The liquid ejecting device according to claim 1, further comprising a detector configured to detect a surface of the liquid stored in the container, wherein a part of the detector is positioned in the container.

16. The liquid ejecting device according to claim 1, wherein the container has a first base section, and a first extending section that extends from an upper portion of the first base section, and wherein the liquid reservoir has a second base section, and a second extending section that extends from a lower portion of the second base section.

17. The liquid ejecting device according to claim 1, wherein the container has a first base section, and a first extending section that extends from a lower portion of the first base section, and wherein the liquid reservoir has a second base section, and a second extending section that extends from an upper portion of the second base section.

18. The liquid ejecting device according to claim 1, wherein the container has an outflow port configured to let the liquid stored in the container flow out therethrough, the outflow port being positioned below the liquid flow path.

19. The liquid ejecting device according to claim 1, wherein the gas flow path is further configured to, when the liquid reservoir is attached to the container, come into a communicable state at a same time as or earlier than the liquid flow path.

20. The liquid ejecting device according to claim 1, wherein the gas flow path is further configured to, when the liquid reservoir is attached to the container, come into a communicable state later than the liquid flow path.

21. The liquid ejecting device according to claim 1, wherein the gas flow path is further configured to, when the liquid reservoir is removed from the container, come into an incommunicable state at a same time as or later than the liquid flow path.

22. The liquid ejecting device according to claim 1, wherein the gas flow path is further configured to, when the liquid reservoir is removed from the container, come into an incommunicable state earlier than the liquid flow path.

23. The liquid ejecting device according to claim 1, wherein the communication section comprises:

a semipermeable membrane; and a labyrinth structure disposed between the internal space of the container and the semipermeable membrane.

24. The liquid ejecting device according to claim 1, wherein the liquid reservoir has the communication section configured to communicate the internal space of the liquid reservoir with the atmosphere, the internal space of the container being communicated with the atmosphere through the communication section and the gas flow path.

25. A liquid reservoir comprising:

a first reservoir valve disposed at a liquid flow path in an attached state where the liquid reservoir is removably attached to a container of a liquid ejecting device; and a second reservoir valve disposed at a gas flow path in the attached state, the liquid flow path and the gas flow path being configured to, in the attached state, communicate an internal space of the container with an internal space of the liquid reservoir, wherein the first reservoir valve and the second reservoir valve are configured to:

change from a closed state into an open state in response to a transition from a separated state where the liquid reservoir is not attached to the container to the attached state; and change from the open state into the closed state in response to a transition from the attached state to the separated state, and wherein in the attached state, when a first liquid-filled region in the internal space of the container is in communication with a second liquid-filled region in the internal space of the liquid reservoir via the liquid flow path, a second gas-filled region in the internal space of the liquid reservoir is in communication with a first gas-filled region in the internal space of the container via the gas flow path and in communication with atmosphere via a communication section of the container, without any liquid-filled region interposed between the second gas-filled region and the atmosphere, and wherein the first gas-filled region directly contacts the first liquid-filled region and the second gas-filled region directly contacts the second liquid-filled region.

26. The liquid reservoir according to claim 25, wherein the communication section comprises a semipermeable membrane, the communication section being configured to communicate the internal space of the liquid reservoir with the atmosphere.

27. The liquid reservoir according to claim 25, further comprising an identification chip.

* * * * *